United States Patent
Ko

(10) Patent No.: US 8,760,504 B2
(45) Date of Patent: Jun. 24, 2014

(54) SHUTTER GLASSES, AND ELECTRONIC APPARATUS AND METHOD FOR ADJUSTING AMBIENT BRIGHTNESS RECEIVED BY SHUTTER GLASSES OPERATIVE UNDER TWO-DIMENSIONAL IMAGE VIEWING MODE

(75) Inventor: Chueh-Pin Ko, New Taipei (TW)

(73) Assignee: Acer Incorporated, Xizhi Dist., New Taipei (TW)

( * ) Notice: Subject to any disclaimer, the term of this patent is extended or adjusted under 35 U.S.C. 154(b) by 364 days.

(21) Appl. No.: 13/330,698

(22) Filed: Dec. 20, 2011

(65) Prior Publication Data
US 2012/0194657 A1    Aug. 2, 2012

(30) Foreign Application Priority Data
Jan. 27, 2011  (TW) .............................. 100103024 A

(51) Int. Cl.
*H04N 13/04* (2006.01)
(52) U.S. Cl.
USPC ............................................... 348/56; 348/51

(58) Field of Classification Search
USPC ................. 386/56, 42, 51, 46, 47, 52, 50
See application file for complete search history.

(56) References Cited

U.S. PATENT DOCUMENTS

2011/0050865 A1*   3/2011   Seong et al. .................... 348/53

FOREIGN PATENT DOCUMENTS

| CN | 102375243 A | 3/2012 |
| TW | 200843524 | 11/2008 |
| TW | 201004312 | 1/2010 |
| TW | 201215089 | 4/2012 |
| TW | 201220819 | 5/2012 |

* cited by examiner

*Primary Examiner* — Robert Chevalier
(74) *Attorney, Agent, or Firm* — Winston Hsu; Scott Margo

(57) ABSTRACT

A method for adjusting an ambient brightness received by a pair of shutter glasses which are operative under a two-dimensional image viewing mode includes: generating an ambient brightness control signal; and adjusting a shutter-open period of eyeglass (s) of the shutter glasses according to the ambient brightness control signal, for adjusting a length of the shutter-open period of the eyeglass (s) to be longer than an activation time length of a backlight of a display device so as to adjust the received ambient brightness.

18 Claims, 11 Drawing Sheets

SHUTTER GLASSES, AND ELECTRONIC APPARATUS AND METHOD FOR ADJUSTING AMBIENT BRIGHTNESS RECEIVED BY SHUTTER GLASSES OPERATIVE UNDER TWO-DIMENSIONAL IMAGE VIEWING MODE

BACKGROUND OF THE INVENTION

1. Field of the Invention

The present invention relates to a scheme of adjusting ambient brightness received by shutter glasses, and more particularly to shutter glasses, and a corresponding electronic apparatus and method for dynamically adjusting the ambient brightness received by the shutter glasses when the shutter glasses operates under a two-dimensional image viewing mode.

2. Description of the Prior Art

Due to recent developments in video technology, users are pursuing three-dimensional (3D) and more real video displays as opposed to high quality images. Currently, there are two techniques for presenting a 3D video display. The first technique uses a video display apparatus which collaborates with 3D glasses (e.g. anaglyph glasses, polarization glasses or shutter glasses) while the second technique directly uses a video display apparatus without any accompanying 3D glasses.

The above-mentioned shutter glasses include two shutter lenses, which allow a user's left eye to see left-eye images and the user's right eye to see right-eye images via properly switching the shutter lens between an open state and a closed state.

When the user wears the shutter glasses, the brightness of a display area perceived by the user (e.g. the brightness of the 3D image displayed by the display screen) may be different from the ambient brightness beyond the display area as perceived by the user (i.e. the brightness of the ambient environment not belonging to the display screen). For example, the light beams of the ambient environment may not particularly undergo polarization processing, and the polarizer included in the shutter lens structure of the conventional shutter glasses will therefore cause the ambient brightness to have a significant decrease. When the liquid crystal layer in the shutter lens structure of the shutter glasses is in an open state, at least 50% of the ambient light is filtered by the polarizer, resulting in the ambient brightness perceived by the user being only 35-40% of the original ambient brightness. That is, regarding the ambient light, the light transmission rate of the shutter lenses operated under the open state is about 35-40%.

In the video output apparatus (e.g. a linear polarization or circular polarization display device), the image light output of the 3D image has a certain polarization direction, and the shutter lens structure of the shutter glasses which is used to collaborate with the video output apparatus has the same polarization direction. The polarizer in the shutter lens structure of the shutter glasses will therefore not cause the brightness of the original image light output to have a significant decrease. When the liquid crystal layer in the shutter lens structure of the shutter glasses is in an open state, only 10-20% of the brightness of the display area is filtered out by the polarizer, so about 65-70% of the original brightness of the display area finally reaches a user's eyes. That is, regarding the image light output of the display area, the light transmission rate of the shutter lens operated under the open state is about 65-70%. Since the shutter lens alternatively switches between the open state and closed state rather than constantly being in the open state the actual shutter-open period of the shutter glasses has an impact on the brightness of the ambient environment beyond the display area perceived by the user via the shutter glasses. Thus, the final brightness perceived by the user (i.e. the light transmission rate of the shutter lens) is substantially equal to the light transmission rate of the shutter lens operated under the open state multiplied by a ratio of the shutter-open period of the shutter lens to the whole glasses period (assuming that the liquid crystal layer can filter out any incoming light beams when in the closed state). The shutter lens operated under the open state has a light transmission rate of 35% for ambient light and has a light transmission rate of 70% for the image light output of the display area. When the ratio of the shutter-open period of the shutter lens to the whole glasses period is 16%, the final brightness of the display area the user feels is 11.2% (70%×16%). The final ambient brightness perceived by the user, however, is only 5.6% (35%× 16%), which is lower than an acceptable level.

The shutter lens control mechanism employed by the conventional shutter glasses only takes 3D image viewing into consideration, and does not consider the ambient brightness perceived by the user. In other words, there is no function implemented for adjusting the ambient brightness perceived by the user. When the user perceives insufficient ambient brightness, they may fail to recognize objects (e.g. a keyboard or a remote control) beyond the display area of the video display apparatus.

SUMMARY OF THE INVENTION

It is therefore one of the objectives of the present invention to provide shutter glasses, and a corresponding electronic apparatus and method for dynamically controlling/adjusting the ambient brightness received by the shutter glasses when the shutter glasses operate under a two-dimensional image viewing mode, so as to solve the above-mentioned problems.

According to an embodiment of the present invention, a method for controlling an ambient brightness received by a pair of shutter glasses is disclosed. The shutter glasses operate under a two-dimensional image viewing mode. The method comprises: generating an ambient brightness control signal; and adjusting a shutter-open period of a shutter lens of the shutter glasses in accordance with the ambient brightness control signal so as to make a length of the shutter-open period of the shutter glasses be longer than an activation time length of a backlight of a display device, for adjusting the ambient brightness received by the shutter glasses.

According to an embodiment of the present invention, a pair of shutter glasses for controlling an ambient brightness received by shutter lenses of the shutter glasses that are operated under a two-dimensional image viewing mode is disclosed. The shutter glasses comprise a left-eye shutter lens, a right-eye shutter lens, and an adjusting circuit. The adjusting circuit is coupled to the left-eye and right-eye shutter lenses and utilized for adjusting a shutter-open period of the shutter glasses in accordance with an ambient brightness control signal, so as to make a length of the shutter-open period of the shutter glasses be longer than an activation time length of a backlight of a display device, for adjusting the ambient brightness received by the shutter glasses.

According to an embodiment of the present invention, a control signal generator for adjusting an ambient brightness received by a pair of shutter glasses is disclosed. The shutter glasses operate under a two-dimensional image viewing mode. The control signal generator is utilized for generating an ambient brightness control signal and outputting the ambient brightness control signal to the shutter glasses for adjusting a shutter-open period of the shutter glasses, so as to make a length of the shutter-open period of the shutter glasses be longer than an activation time length of a backlight of a display device, for adjusting the ambient brightness received by the shutter glasses.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
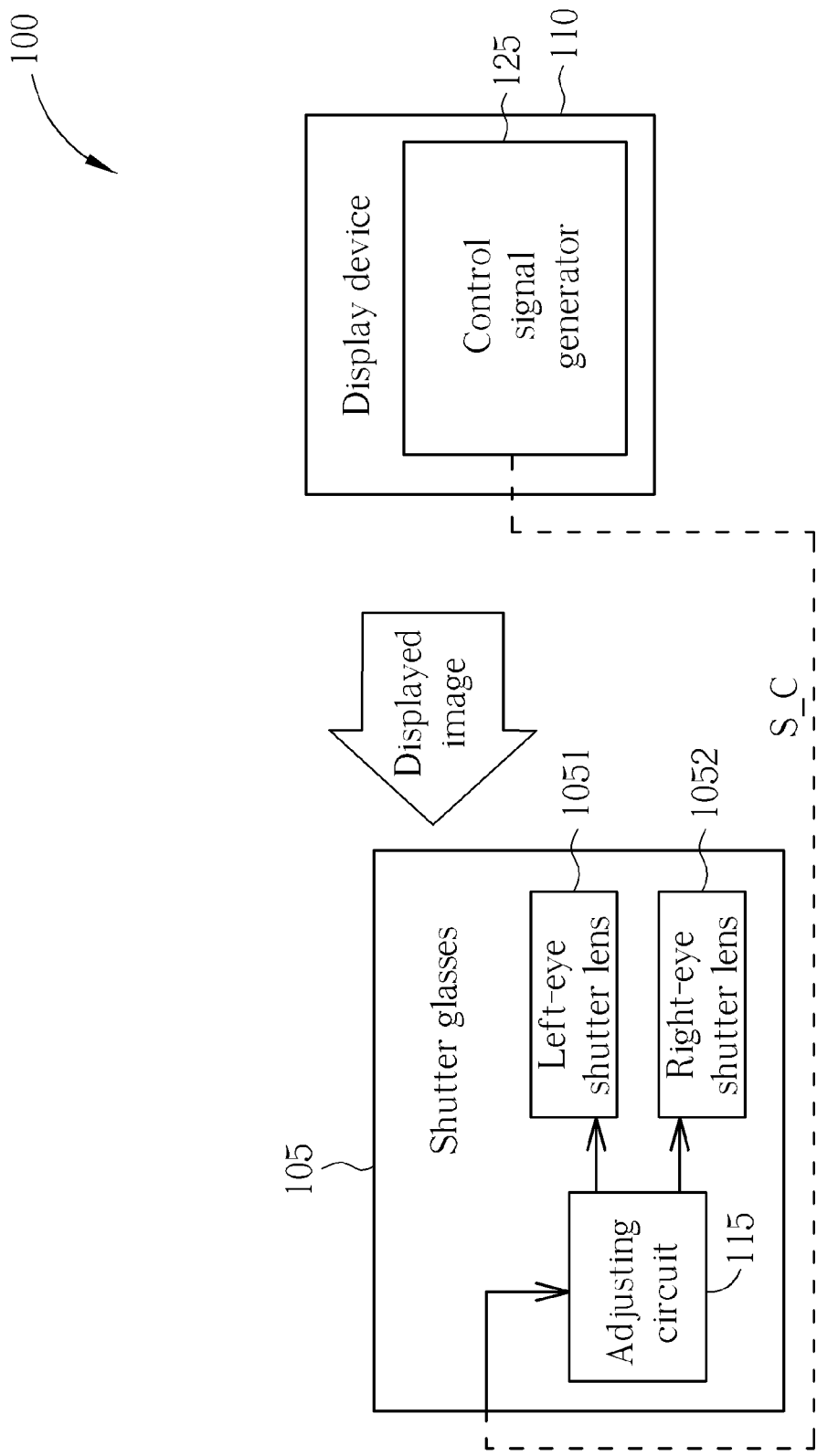
FIG. 1A is a diagram illustrating an image display system according to a first embodiment of the present invention.
Figure 1B:
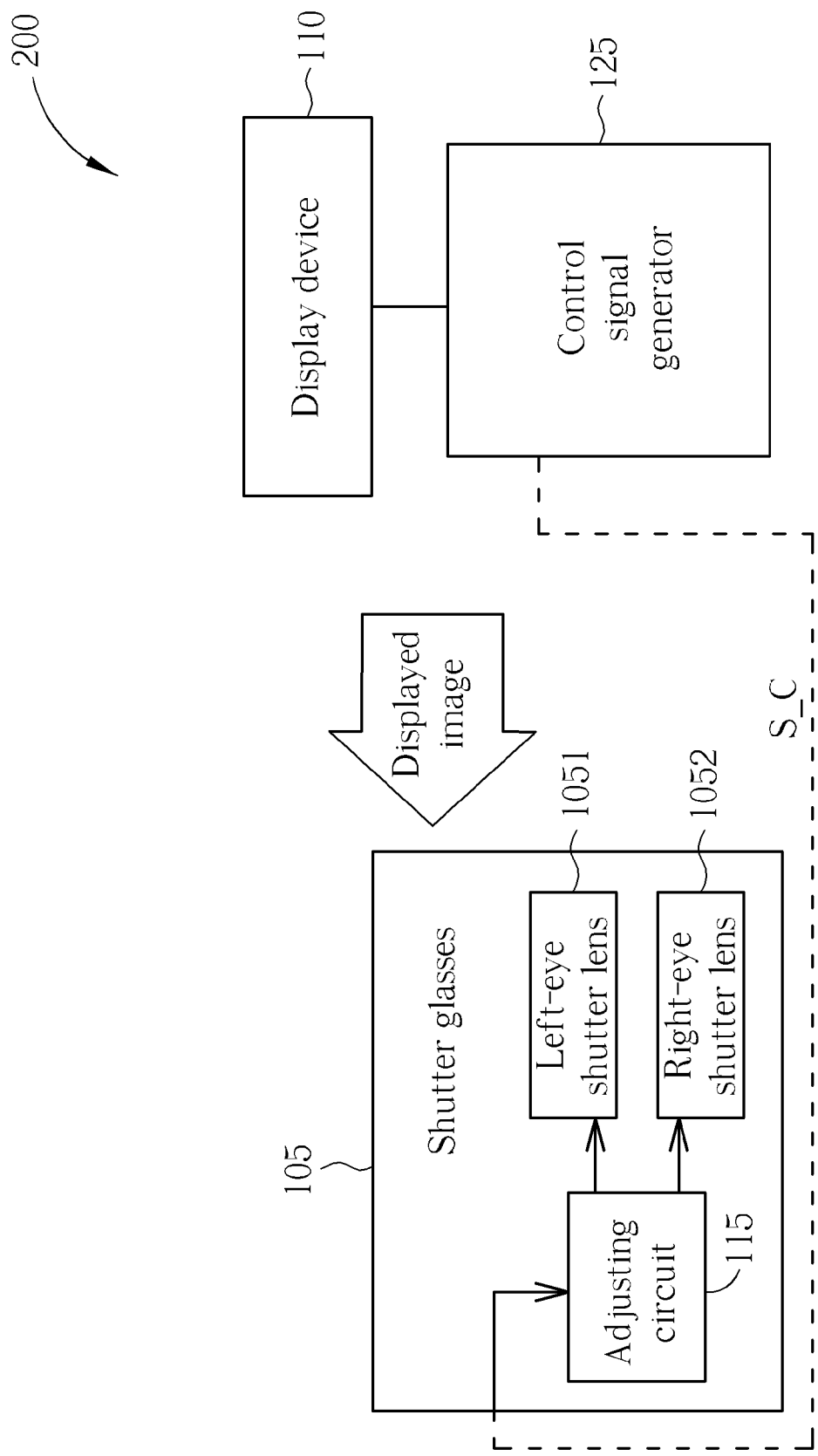
FIG. 1B is a diagram illustrating an image display system according to a second embodiment of the present invention.

Please refer to FIG. 1A, which is a diagram illustrating an image display system 100 according to preferred embodiments of the present invention. The image display system 100 comprises a pair of shutter glasses 105 and a display device 110. The shutter glasses 105 comprise a left-eye shutter lens 1051, a right-eye shutter lens 1052, and an adjusting circuit 115. The shutter glasses 105 are able to dynamically adjust received ambient brightness. The shutter glasses 105 operate under a two-dimensional (two-dimensional) image viewing mode. The adjusting circuit 115 is utilized for receiving an ambient brightness control signal S_C that is generated from an external circuit, and for adjusting the shutter-open period of the shutter glasses 105 in accordance with the received ambient brightness control signal S_C so as to make the shutter-open period of the shutter glasses 105 be longer than an activation time period of the backlight of the display device 110 for adjusting the ambient brightness received by the shutter glasses 105. The external circuit can be any externally coupled electronic devices such as the display device 110 or a sensor or remote controller that is electronically connected to the display device 110. In this embodiment, the ambient brightness control signal S_C is generated by a control signal generator 125 configured within the display device 110 and outputted to the shutter glasses 105. In another embodiment, as shown in FIG. 1B, the control signal generator 125 can be also designed to externally couple (electronically connect) to the display device 110. In the following, the operation and function of the shutter glasses 105 are described, and the operation and function can be applied into both embodiments shown in FIG. 1A and FIG. 1B.

As mentioned above, the control signal generator 125 which is included within the apparatus 100 or externally connected to the apparatus 100 includes the abilities of image analysis and ambient brightness detection. The shutter glasses 105 only need to be activated for receiving the ambient brightness control signal S_C outputted by the control signal generator 125 and operating according to the ambient brightness control signal S_C. In practice, the implementation costs can be reduced based on the above-mentioned design. The ambient brightness control signal S_C outputted to the shutter glasses 105 can be a control signal for directly controlling an open/closed state of the shutter lenses of the shutter glasses 105, or can be an ambient brightness control and synchronization signal for controlling the shutter glasses 105.

It should be noted that, in this embodiment, the shutter glasses 105 can be glasses for viewing a three-dimensional (3D) image picture/stream and a two-dimensional (two-dimensional) image picture/stream. In other words, in response to the different types or categories of images displayed by the display device 110, a user can choose a desired operating mode using the shutter glasses 105 by themselves or choose a proper operating mode according to an instruction of the display device 110. This can effectively allow the user to view or perceive the images displayed by the display device 110. In this example, the shutter glasses 105 can be regarded as shutter glasses including both a three-dimensional image viewing mode and a two-dimensional image viewing mode. In another embodiment, the shutter glasses 105 can also be used by the user to view only two-dimensional images so the shutter glasses 105 can be used to operate only under the two-dimensional image viewing mode.

The ambient brightness control signal S_C can be generated by the shutter glasses. Please refer to FIG. 1C, which is a diagram of an image display system 300 according to a third embodiment of the present invention. The image display system 300 comprises a pair of shutter glasses 305 and the display device 110. The shutter glasses 305 comprise a left-eye shutter lens 1051, a right-eye shutter lens 1052, a control signal generator 310, and an adjusting circuit 115. In this embodiment, the control signal generator 310 is arranged to generate the ambient brightness control signal S_C according to changes in the images (e.g. changes in brightness, color, and gray scale) displayed on the panel of the display device 110, the ambient brightness, and instruction signal(s) used for controlling the shutter glasses 305. The operations and functions of the left-eye shutter lens 1051, right-eye shutter lens, and the adjusting circuit 115 are identical to those of the circuit elements with the same names shown in FIG. 1A and FIG. 1B, and are not detailed here for brevity.

Figure 5A:
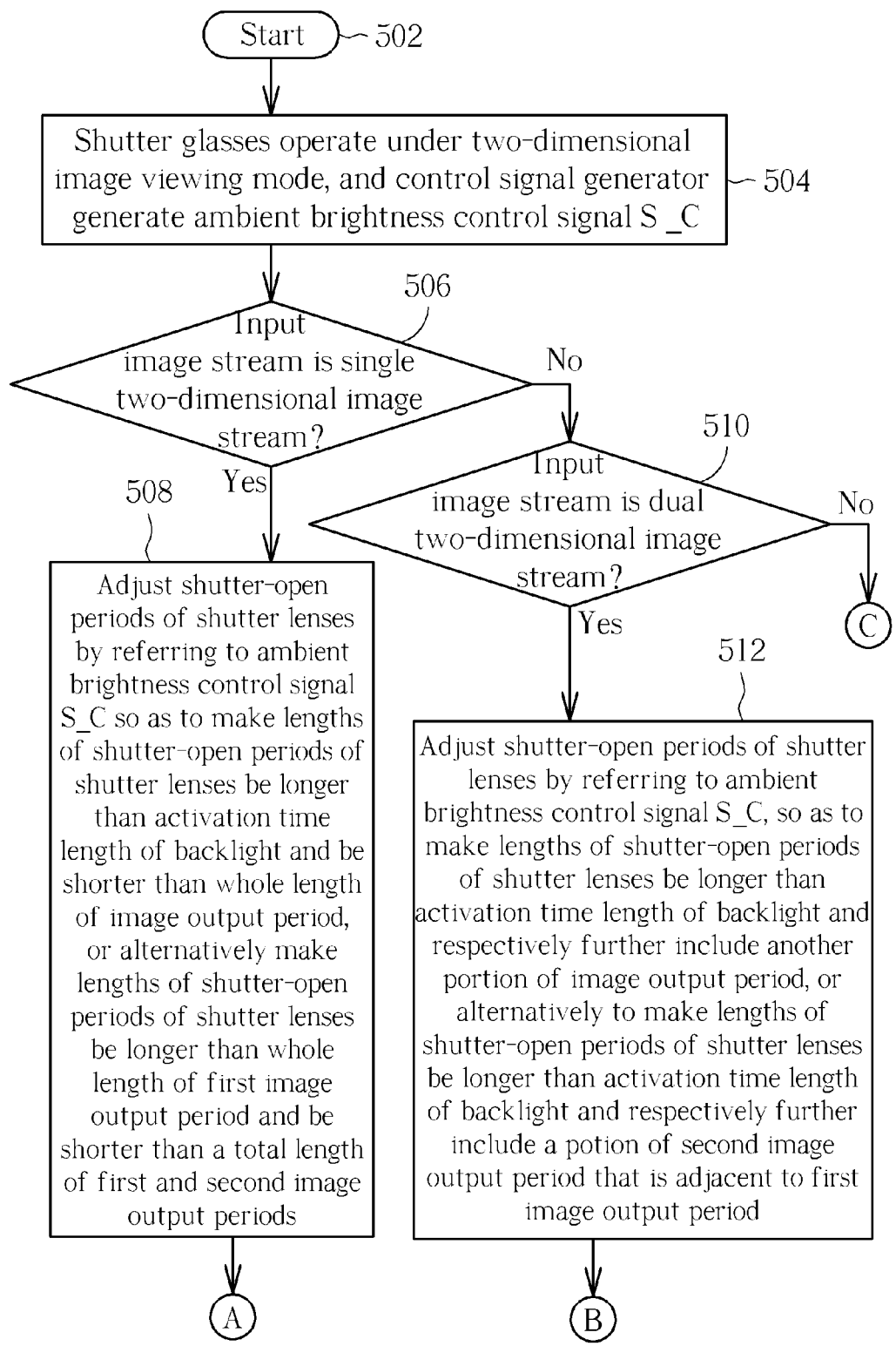
FIG. 5A and FIG. 5B are diagrams respectively illustrating flowcharts of the method for controlling the ambient brightness received via the shutter glasses according to the embodiments of the present invention.
Figure 5B:
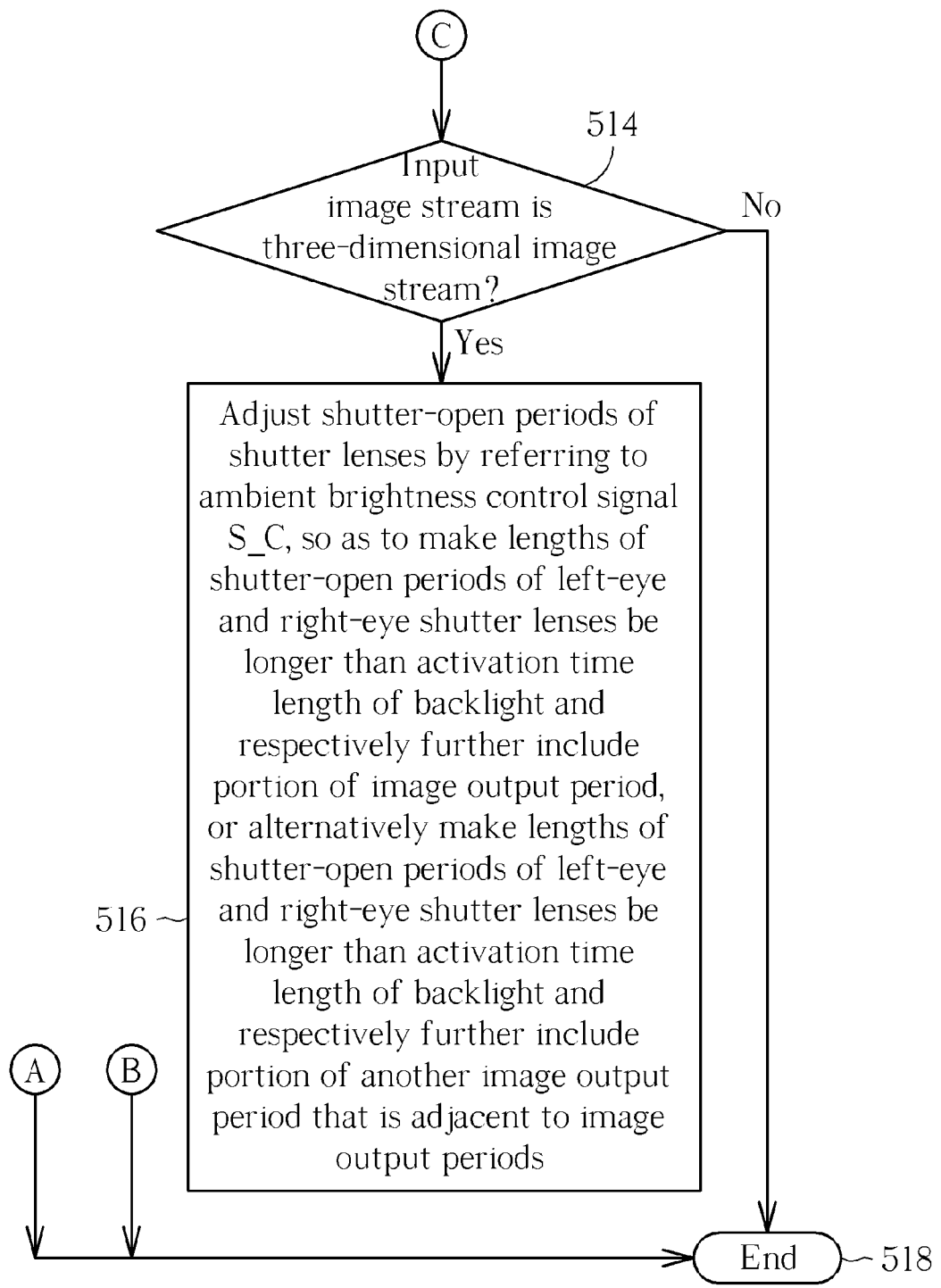

As shown in FIG. 1A-1B and FIG. 5, the operation of generating the ambient brightness control signal S_C shown in this embodiment can be implemented and included in any electronic device such as a pair of shutter glasses, a display device, or a sensor device/remoter which is externally coupled to a display device. When including the operation of generating the ambient brightness control signal S_C, the remoter can be used to directly transmit the ambient brightness control signal S_C to the shutter glasses. The remoter can indirectly send the ambient brightness control signal S_C to the shutter glasses via the display device. The display device in this example is used as an intermediate device for receiving the ambient brightness control signal S_C sent from the remoter and then transmitting the ambient brightness control signal S_C to the shutter glasses. In addition, the operation of generating the ambient brightness control signal S_C to adjust the shutter-open period of the shutter lens of the shutter glasses can be performed based on or according to changes in the images (e.g. changes in brightness, color, and gray scale) displayed on the panel of the display device 110, the ambient brightness, and instruction signals used for controlling the shutter glasses (e.g. an instruction signal utilized for enabling or disabling the shutter glasses).

Figure 2A:
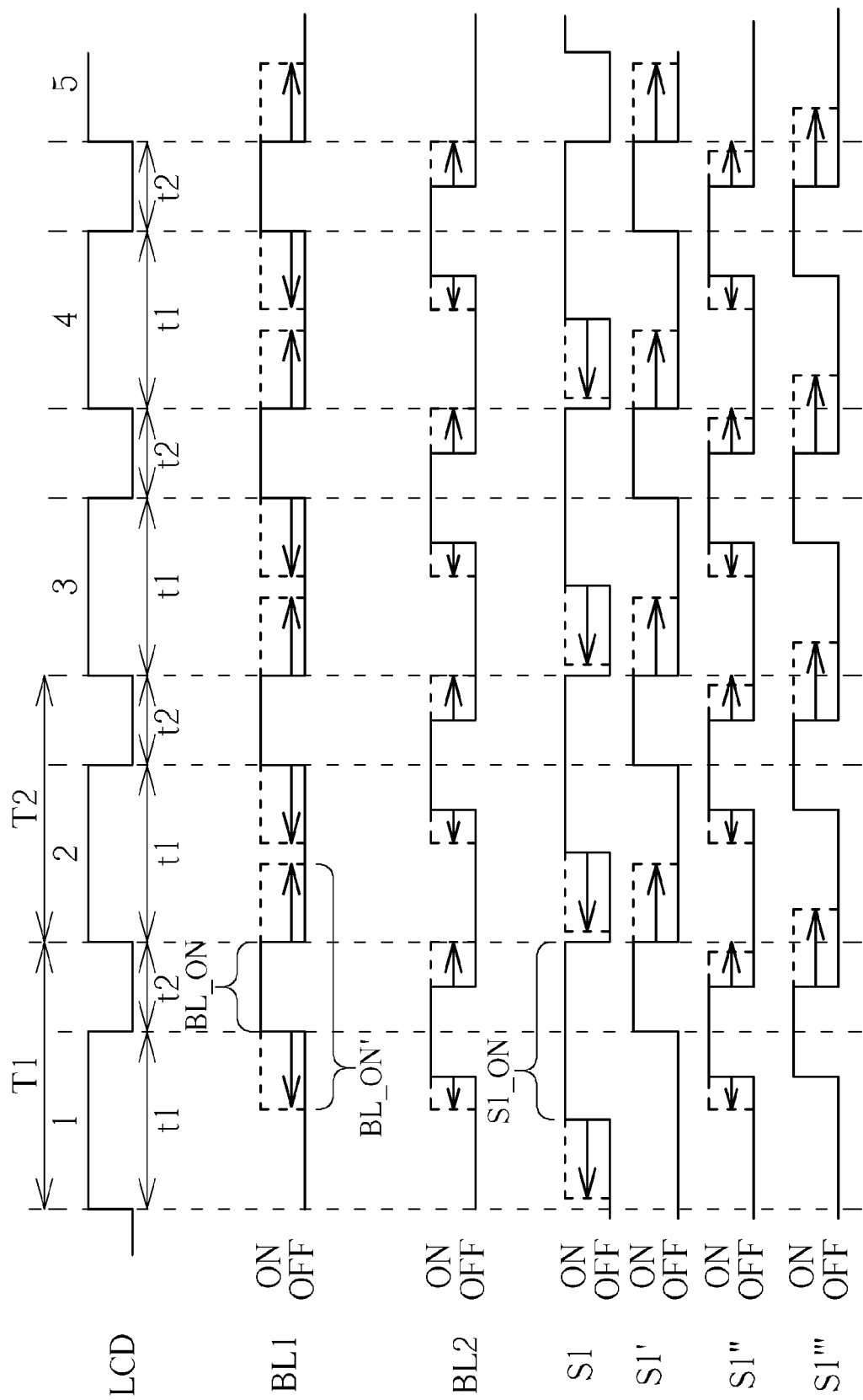
FIG. 2A is a diagram illustrating an embodiment in which the shutter glasses shown in FIG. 1A and FIG. 1B are operative under a two-dimensional image viewing mode and applied to viewing a two-dimensional image stream.
Figure 2B:
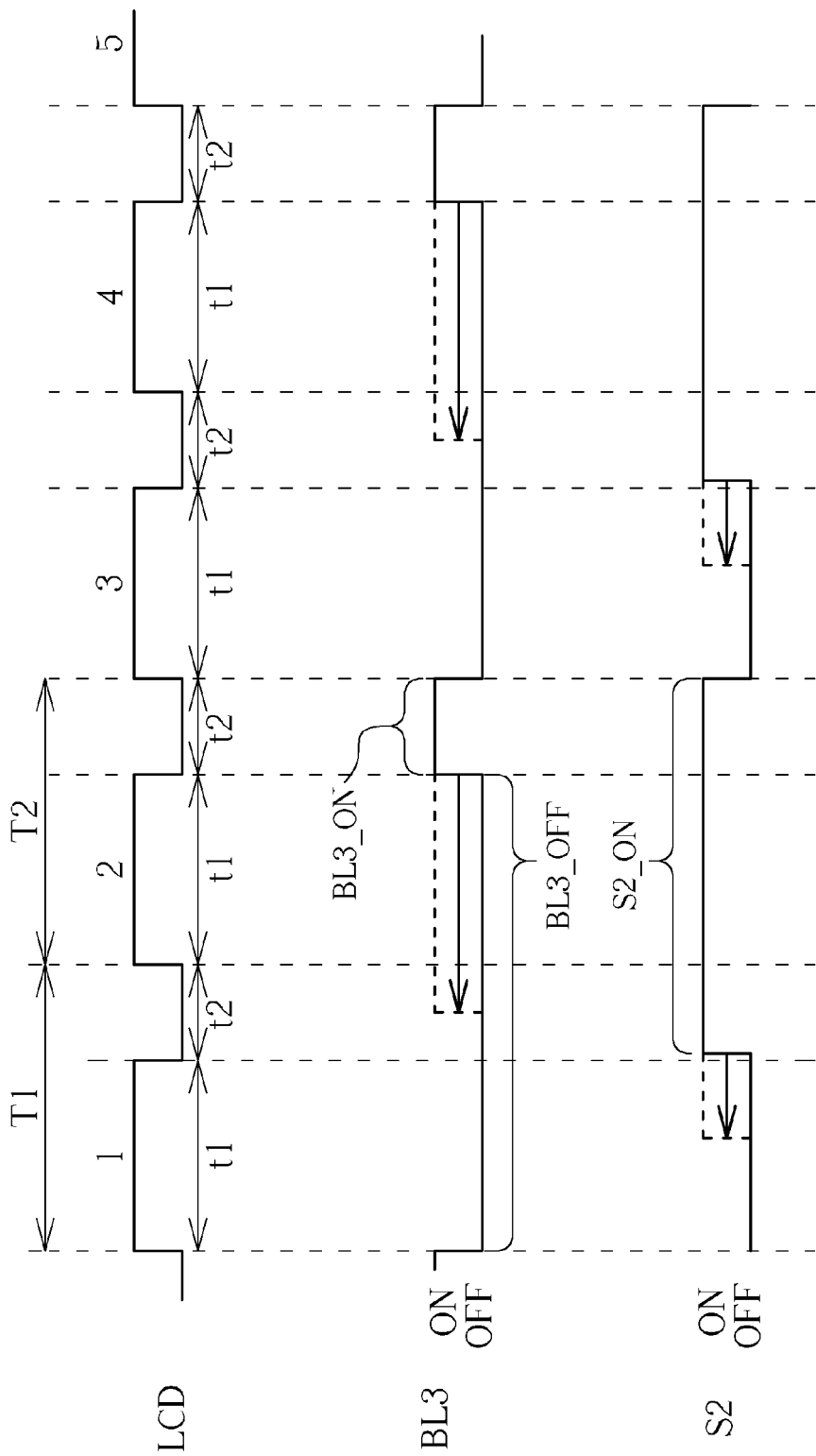
FIG. 2B is a diagram illustrating another embodiment in which the shutter glasses shown in FIG. 1A and FIG. 1B are operative under a two-dimensional image viewing mode and applied to viewing a two-dimensional image stream.
Figure 3:
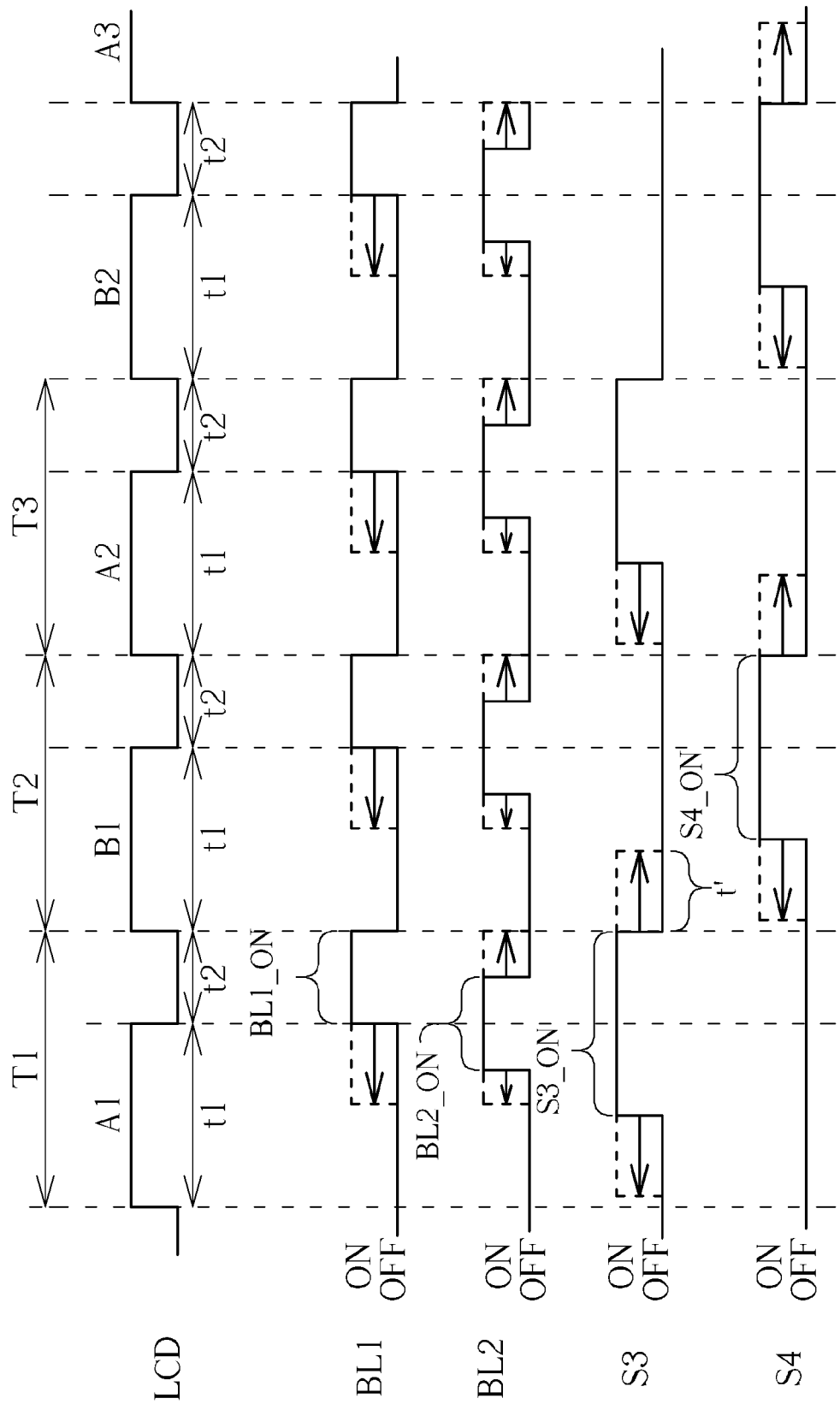
FIG. 3 is a diagram illustrating an embodiment in which the shutter glasses shown in FIG. 1A and FIG. 1B are operative under a two-dimensional image viewing mode and applied to viewing a dual two-dimensional image stream.
Figure 4A:
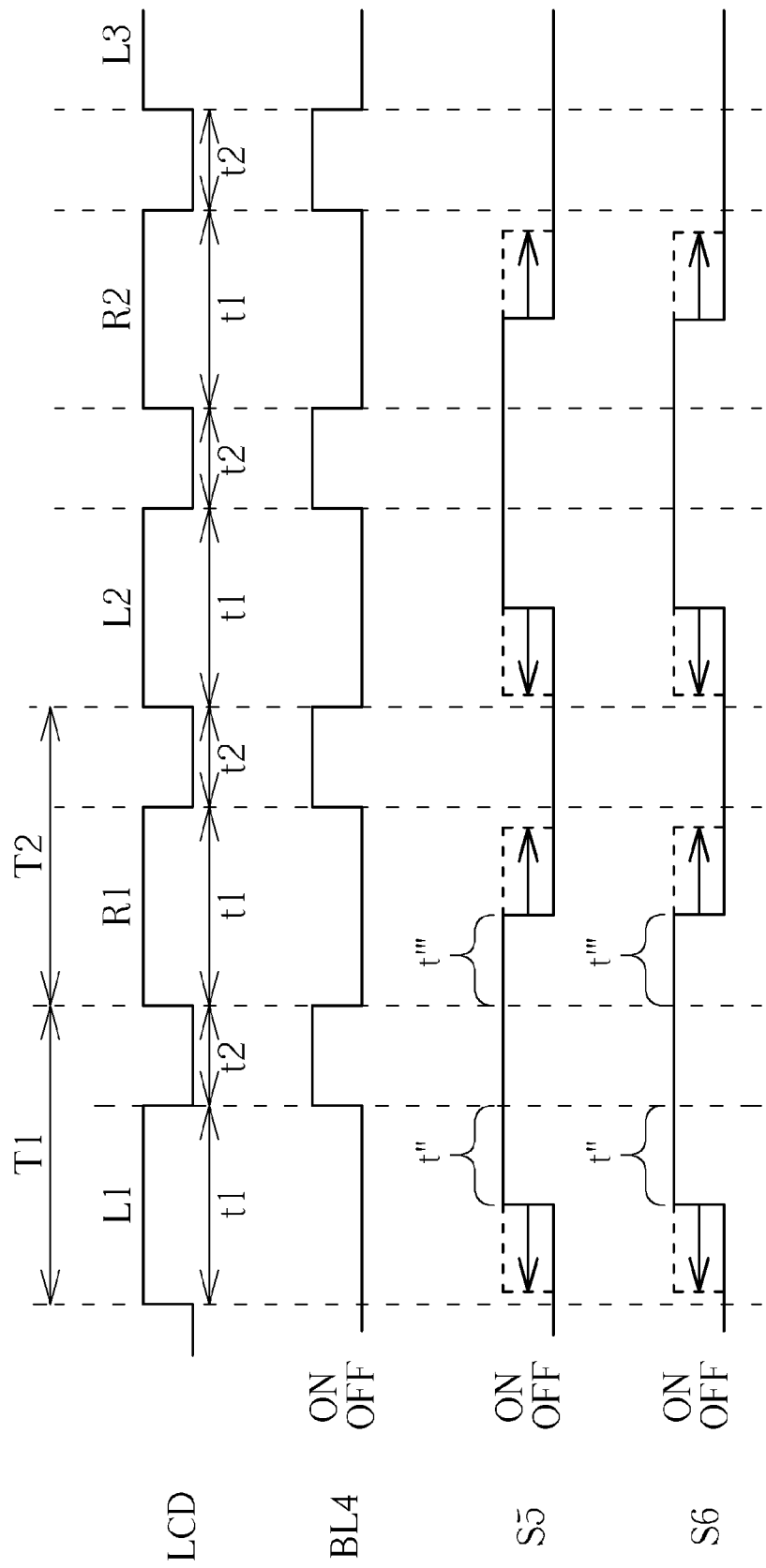
FIG. 4A-FIG. 4C are diagrams respectively illustrating embodiments in which the shutter glasses shown in FIG. 1A and FIG. 1B are operative under a two-dimensional image viewing mode and applied to viewing a three-dimensional image stream.
Figure 4B:
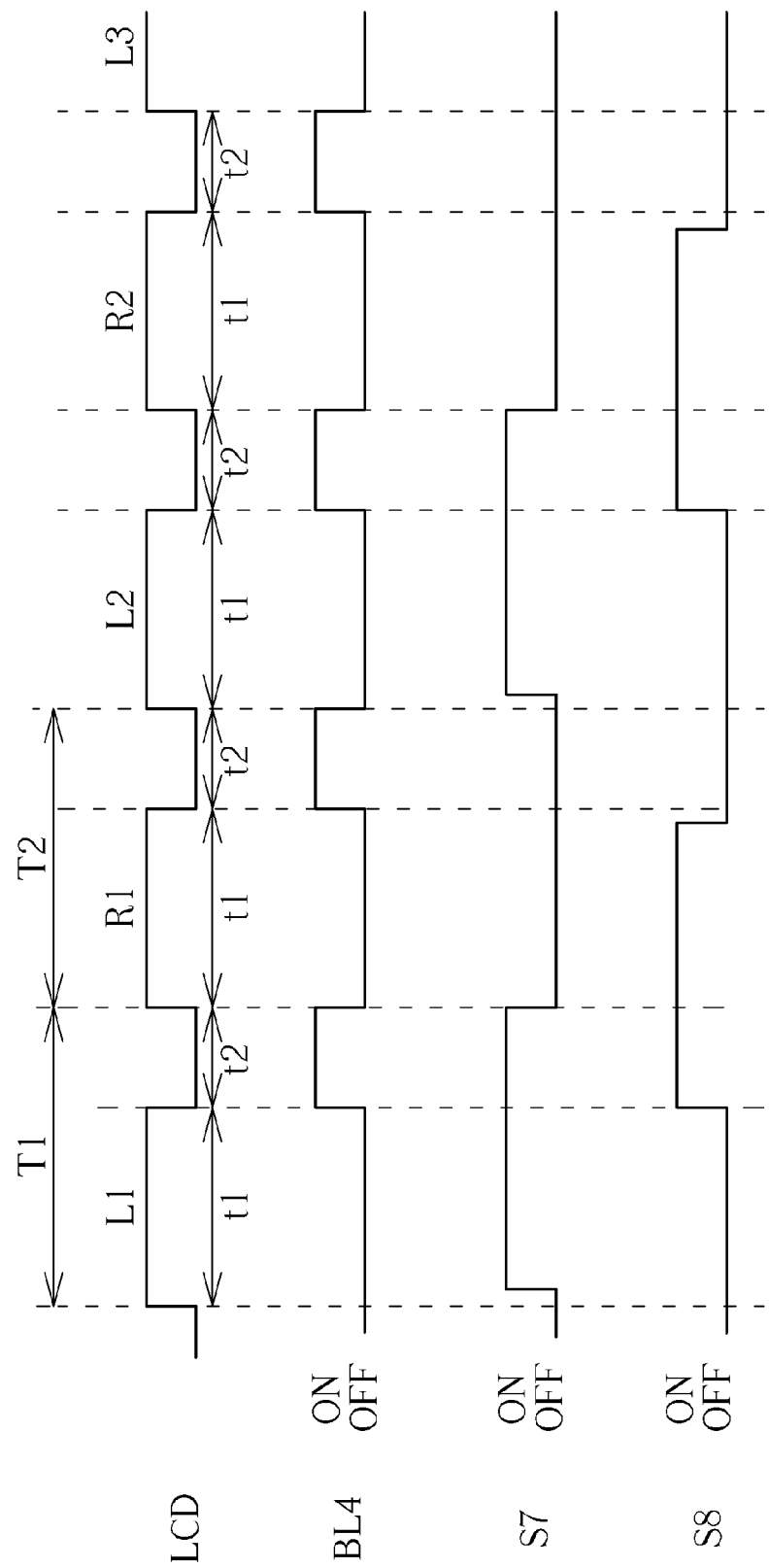
Figure 4C:
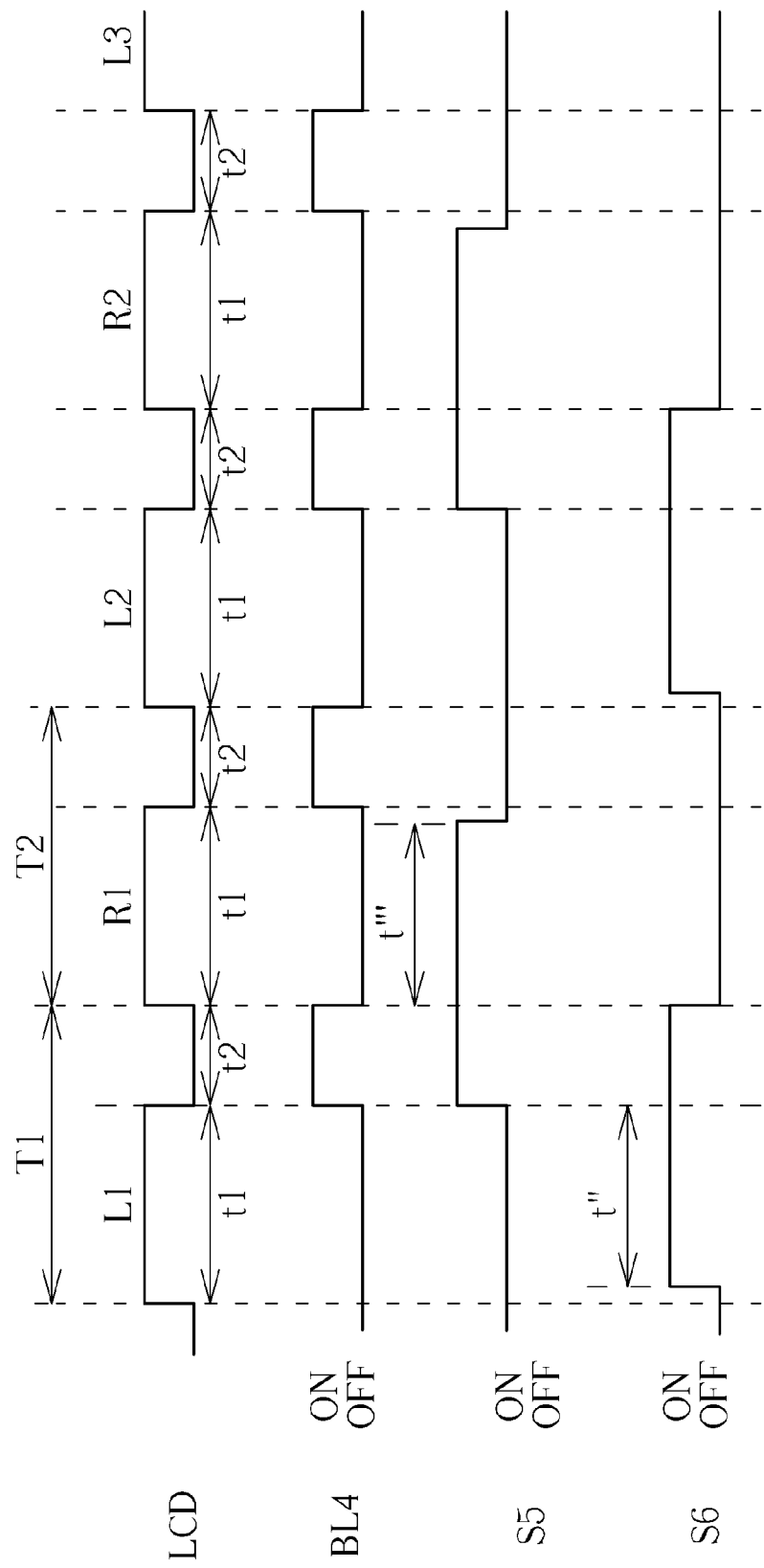

In the following description, several embodiments of the present invention are provided to explain how to dynamically adjust the received ambient brightness using the adjusting circuit 115 when the shutter glasses 105 operate under the two-dimensional image viewing mode. FIG. 2A and FIG. 2B respectively illustrate different embodiments in which the user views a single two-dimensional image stream. FIG. 3 illustrates an embodiment in which the user views a dual two-dimensional image stream. FIG. 4A-FIG. 4C respectively illustrate different embodiments in which the user views three-dimensional image streams.

Please refer to FIG. 2A, which is a diagram illustrating an embodiment in which the shutter glasses 105 shown in FIG. 1A-FIG. 1B are applied to viewing a two-dimensional image stream. The display device 110 includes a three-dimensional display panel with the three-dimensional display techniques. If an input image source is a three-dimensional image stream, the display device 110 can alternately output a first image picture such as a left-eye image and a second image picture such as a right-eye image during multiple different image output periods when used for displaying the three-dimensional image stream, so as to let the user perceive three-dimensional images. In contrast to the description mentioned above, in this embodiment, the display device 110 is arranged to display a two-dimensional image stream. In order to let the user perceive two-dimensional images, the display device 110 is arranged to display duplicated identical images respectively on the display panel during the corresponding image output periods in which the display device 110 is arranged to output the left-eye and right-eye images for displaying the three-dimensional images. The operation of displaying duplicated identical images during such periods can make the user perceive the presentation of the two-dimensional images without viewing three-dimensional images. As shown in FIG. 2A, a first video corresponding to the first image picture during the image output period T1 is identical to a second video corresponding to the second image picture during the image output period T2. For displaying the three-dimensional images, T1 is an image output period in which a left-eye image is outputted, and T2 is another image output period in which a right-eye image is outputted.

As shown in FIG. 2A, a curve LCD represents that each of the image output periods used by the display device 110 is divided into a paint time t1 and a hold time t2. During the paint time t1, the display device 110 is arranged to rotate liquid crystal units of the display panel for changing pixel values from a previous frame to the next frame. The rotation time of the liquid crystal units is known as a response time of the liquid crystal units. In addition, during the hold time t2, the display device 110 is arranged to wait until the rotation of each of the liquid crystal units is finished. In this embodiment, the activation time of the backlight of the display device 110 comprises a portion of an image output period. For example, the activation time of the backlight, e.g. the period BL_ON indicated by the solid lines of the curve BL1, comprises a portion of the hold time t2. Substantially, the activation time of the backlight is comprised of the total hold time t2. In addition, the activation time length of the backlight can be extended or prolonged to become a longer length BL_ON' as indicated by the arrows and dotted lines of the curve BL1. Please note that the hold time t2 can be designed to be longer or shorter. For example, the length of the hold time t2 can be designed to be a longer time length such as thirty percent of the image output period T1. When the length of the hold time t2 is longer, the activation time length of the backlight can be designed to include a time length as indicated by BL_ON as shown in FIG. 2A. Additionally, the hold time t2 can be designed to include a shorter length such as only five percent of the image output period T1. When the length of the hold time t2 is shorter, the activation time of the backlight can be designed or configured according to the curve BL2 shown in FIG. 2A. The activation time of the backlight as indicated by the curve BL2 comprises a portion of the paint time t1 and a portion of the hold time t2. As mentioned above, in this embodiment, the activation time of the backlight is configured or designed to include a portion of one of the image output periods wherein the activation time length of the backlight is not longer than the total length of the image output period. Other modifications based on the above-mentioned embodiments should fall within the scope of the present invention.

In this embodiment, the image of the first image picture is identical to that of the second image picture. In other words, the images of the first video including each first image picture are equal or identical to that of the second video including each second image picture. No matter how the shutter glasses 105 controls switching both the left-eye and right-eye shutter lens 1051 and 1052 between the open state and the closed state, the left-eye and right-eye of the user perceive the same images. Therefore, the human eyes merely perceive the presentation of the two-dimensional images and do not perceive the presentation of any three-dimensional images. The display device 110 having the ability of presenting three-dimensional images is therefore capable of displaying two-dimensional images on the display panel according to the above-mentioned description. In order to adjust the ambient brightness received by the shutter lenses, the adjusting circuit 115 is arranged to adjust the shutter-open period S1_ON of the left-eye shutter lens 1051 during the image output period T1 and the shutter-open period of the right-eye shutter lens 1052 during the image output period T2 by referring to the ambient brightness control signal S_C so as to make the length of the shutter-open period of each shutter lens be longer than or equal to the portion of the image output period and be shorter than the image output period wherein the portion is the activation time length BL ON of the backlight. This can effectively adjust the ambient brightness received via the shutter glasses 105. In addition, since the length of the shutter-open period S1_ON is configured in accordance with the activation time length of the backlight, it is not necessary for the length of the shutter-open period S1_ON to be equal to the activation time length of the backlight. The length of the shutter-open period S1_ON can be adjusted in accordance with different requirements. For example, the curves S1, S1', S1", and S1'" as shown in FIG. 2A are indicative of different lengths of the shutter-open period of each shutter lens.

The ON/OFF status of the curve BL1 as shown in FIG. 2A represents that the backlight of the display device 110 is turned on or enabled during at least the hold time t2 of each image output period. For example, the solid lines of the curve BL1 represents that the backlight is turned on during the hold time t2 and is turned off during the paint time t1. In order to adjust the received ambient brightness, as indicated by the solid lines of the curve S1, the adjusting circuit 115 is arranged to adjust the length of the shutter-open period S1_ON of the shutter lens 1051 so that the length of the shutter-open period S1_ON can be longer than the activation time length of the backlight BL_ON and extended/prolonged to include a portion of the paint time t1 of the image output period T1. In other words, the length of the shutter-open period S1_ON is longer than the activation time length BL_ON of the backlight and shorter than the total length of the image output period T1. Similarly, the adjusting circuit 115 is arranged to adjust the length of the shutter-open period of the shutter lens 1052 so that the length of the shutter-open period S1_ON can be longer than the activation time length BL_ON of the backlight and extended/prolonged to include a portion of the paint time t1 of the image output period T2. In other words, the length of the shutter-open period S1_ON is longer than the activation time length BL_ON of the backlight and shorter than the total length of the image output period T2.

The activation time of the backlight of the display device 110 can also be slightly adjusted or calibrated according to the curve BL2 shown in FIG. 2A. As indicated by arrows and dotted lines of the curve S1, under a condition that the length of the shutter-open period S1_ON is not longer than the total length of the image output period T1, the adjusting circuit 115 can gradually extend/prolong the length of the shutter-open period S1_ON to adjust the ambient brightness received via the shutter lenses 1051 and 1052. Other modifications for adjusting the length of the shutter-open period S1_ON should also fall within the scope of the present invention. In addition, as indicated by the arrows and dotted lines of the curve S1', the length of the shutter-open period S1_ON indicates that the shutter-open period a shutter lens includes the whole activation time of the backlight corresponding to the image output period T1 and can be extended/prolonged by the adjusting circuit 115 to further include a portion of the next image output period T2. It should be noted that the shutter-open period of a shutter lens corresponding to the image output period T1 does not include any portion of the activation time of the backlight corresponding to the image output period T2. Further, as indicated by the arrows and dotted lines of the curve S1", the length of the shutter-open period S1_ON of a shutter lens corresponds to the activation time of the backlight as shown by the curve BL2. The length of the shutter-open period S1_ON of the curve S1' indicates that it is not necessary for the shutter-open period to include the total hold time t2 of the time period T1, i.e. the length of the shutter-open period S1_ON is not necessarily associated with the length of the hold time t2. In one embodiment, the shutter-open period S1_ON of a shutter lens can be designed or configured to be independent of the hold time t2. Further, as indicated by the arrows and dotted lines of the curve S1''', the length of the shutter-open period S1_ON corresponds to the activation time length of the backlight as shown by the curve BL2. In addition, the shutter-open period can be extended or prolonged to further include a portion of the paint time t1 of the next time period T2. Please note that the shutter-open period of a shutter lens indicated by the curve S1''' does not include any portion of the activation time of the backlight corresponding to the time period T2.

Please refer to FIG. 2B, which is a diagram illustrating another embodiment in which the shutter glasses 105 shown in FIG. 1A-FIG. 1B are applied to viewing a two-dimensional image stream. The difference with the embodiment of FIG. 2A is that continuous left-eye and right-eye images are associated with continuous images such as interpolated images, originally generated images, or images having identical content, and the display device 110 is arranged to turn on the backlight during at least the hold time t2 of the time period T2 corresponding to the second image picture. For example, the display device 110 is arranged to turn on the backlight only during the hold time t2 of the time period T2 corresponding to the right-eye image picture, and turn off the backlight during the paint time t1 of the time period T2 corresponding to the right-eye image picture and the total time period T1 corresponding to the left-eye image picture. The operation is indicated by the solid lines BL3_ON and BL3_OFF of the curve BL3 shown in FIG. 2B. The adjusting circuit 115 is arranged to adjust the shutter-open periods of the left-eye and right-eye shutter lenses of the shutter glasses 105 by referring to the ambient brightness control signal S_C so that both the lengths of the shutter-open periods of the left-eye shutter lens 1051 and right-eye shutter lens 1052 are longer than the length of the image output period T1 and shorter than a total length of the image output period T1 and the next adjacent image output period T2.

In this way, the adjusting circuit 115 can properly adjust the ambient brightness received by the shutter glasses 105 and a user can perceive a three-dimensional image. As shown in FIG. 2B, the solid lines BL3_ON of the curve BL3 indicate that the backlight of the display device 110 is turned on or enabled only during the hold time t2 of the time period T2. The backlight is disabled in the OFF status during the paint time t1 and hold time t2 of the time period T1 and the paint time t1 of the time period T2. The arrows and dotted lines of the curve BL3 indicate that the activation time length of the backlight of the display device 110 can be extended or prolonged so that the activation time of the backlight can further include a portion of the paint time t1 of the time period T2 in addition to the whole hold time t2 of the time period T2. In addition, the activation time length can be extended so that the activation time of the backlight can further include a portion of the hold time t2 of the time period T1 or a portion of the paint time t1 of the time period T1. All these modifications of the activation time length of the backlight can be applied as references for determining the lengths of the shutter-open periods of the left-eye shutter lens 1051 and right-eye shutter lens 1052.

The curve S2 represents the lengths of the shutter-open periods of the left-eye shutter lens 1051 and right-eye shutter lens 1052 of the shutter glasses 105. In this embodiment, since the display device 110 is arranged to display two-dimensional images on the display panel for resulting in human eyes perceiving a two-dimensional image effect, the left-eye and right-eye shutter lenses 1051 and 1052 are configured to stay in either the open state or the closed state at the same time, rather than staying in different states. The solid lines S2_ON of the curve S2 indicates that the left-eye and right-eye shutter lenses 1051 and 1052 stay in the open state during the total time period T2 and a portion of the time period T1. The left-eye and right-eye shutter lenses 1051 and 1052 stay in the open state during both the paint time t1 and hold time t2 of the time period T2. In addition, the left-eye and right-eye shutter lenses 1051 and 1052 can be further configured to stay in the open state during the hold time t2 of the time period T1 and stay in the closed state during the paint time t1 of the time period T1. In another embodiment, the arrows and dotted lines of the curve S2 indicate that the left-eye and right-eye shutter lenses 1051 and 1052 can also be configured to stay in the open state during a portion of the paint time t1 of the time period T1 in addition to the hold time t2 of the time period T1. Herein, the lengths of the shutter-open periods of the left-eye shutter lens 1051 and right-eye shutter lens 1052 are determined by the adjusting circuit 115 based on a reference of the ambient brightness control signal S_C. The lengths of the shutter-open periods can be dynamically adjusted or calibrated in response to different environments or different types/categories of images. The shutter glasses 105 having three-dimensional image viewing ability can be operative to dynamically adjust the ambient brightness received by the shutter lenses under the two-dimensional image viewing mode so that the human eyes can perceive enhanced two-dimensional images.

Please refer to FIG. 3, which is a diagram illustrating the operation of the shutter glasses 105 as shown in FIG. 1A and FIG. 1B under the two-dimensional image viewing mode for receiving a dual two-dimensional image stream according to an embodiment of the present invention. The display device 110 is arranged to alternately output the images of the first video and the images of the second video. For example, the images of the first video include a first image picture, and the images of the second video include a second image picture. Outputting of the first image picture and the second image picture is performed during time periods in which a left-eye image frame and a right-eye image frame are respectively outputted for displaying three-dimensional image content. For example, the image output period T1 is a period in which a left-eye image frame is outputted for presentation of three-dimensional image content, and the image output period T2 is a period in which a right-eye image frame is outputted for presentation of three-dimensional image content. In this embodiment, the image of the first image picture is different from that of the second image picture. In other words, the first video and second video are different two-dimensional videos. The image pictures A1, A2, and A3 are included within the first video, and the image pictures B1 and B2 are included within the second video. The first video can be a video segment of HBO TV programs, and the second video can be a video segment of CNN TV programs. The backlight of the display device 110 is turned on or enabled during the hold time t2 of each image output period, as shown by the solid line BL1 ON of the curve BL1 of FIG. 3. The activation time length of the backlight can be extended/prolonged to further include a portion of the paint time t1 of the time period T1 in addition to the hold time t2, as shown by the arrows and dotted lines of the curve BL1 of FIG. 3. In another embodiment, the activation time of the backlight of the display device 110 can be shifted to include a portion of the paint time t1 of the time period T1 and a portion of the hold time t2 of the time period T1, without including whole of the hold time t2. This is illustrated by the sold line part BL2_ON of the curve BL2 shown in FIG. 3. All these modification of the activation time of the backlight obey the spirit of the present invention.

For viewing the dual two-dimensional images, both the left-eye and right-eye shutter lenses of shutter glasses worn by different users stay in the open state during different image output periods so that the different users can respectively use their shutter glasses to watch different video streams on the display panel of the display device 110. If a user would like to watch a video segment of (for example) an HBO TV program, which is broadcast at the image output periods T1, T3 that are originally used to display left-eye pictures of three-dimensional images, then the left-eye and right-eye shutter lenses 1051 and 1052 of the shutter glasses 105 are configured to stay in the open state at the same time during the image output periods T1, T3, and the shutter lenses 1051 and 1052 are configured to stay in the closed state at the same time during the image output period T2 that is originally used to display right-eye pictures of the three-dimensional images. As shown in FIG. 3, the solid lines S3_ON of the signal S3 indicate that the lengths of the shutter-open periods of the left-eye and right-eye shutter lenses 1051 and 1052 are longer than the activation time length BL1_ON or BL2_ON of the backlight, and further include a portion of the paint time t1 of the current time period T1. The arrows and dotted lines of the signal S3 indicate that the adjusting circuit 115 can adjust the lengths of the shutter-open periods of the left-eye and right-eye shutter lenses 1051 and 1052 by referring to the ambient brightness control signal S_C so as to adjust the ambient brightness received via the shutter glasses. In this way, the user can perceive the video segment of the HBO TV programs which are broadcast during the time periods T1, T3 that are originally used for displaying left-eye pictures for three-dimensional images, without viewing other unrelated video segments. Similarly, for viewing a video segment of CNN TV programs which are broadcast during the image output period T2 that is originally used to display right-eye pictures for three-dimensional images, the left-eye and right-eye shutter lenses 1051 and 1052 of the shutter glasses 105 are configured to stay in the closed state simultaneously during the image output periods T1, T3, and stay in the open state simultaneously during the image output periods T2.

As shown in FIG. 3, the solid lines S4_ON of the signal S4 indicate that the lengths of the shutter-open periods of the left-eye and right-eye shutter lenses 1051 and 1052 are longer than the activation time length of the backlight, and the shutter-open periods of the shutter lenses can be configured to respectively further include a portion of the paint time t1 of the image output period T2. The arrows and dotted lines of the signal S4 indicate that the adjusting circuit 115 can adjust the lengths of the shutter-open periods of the left-eye and right-eye shutter lenses 1051 and 1052 by referring to the ambient brightness control signal S_C, so as to adjust the ambient brightness received via the shutter glasses 105.

In this way, the user can simultaneously perceive or watch the video segment of the CNN TV programs which are broadcast during the image output period T2 that is originally used for displaying right-eye pictures of three-dimensional images. The human eye will not perceive other unrelated video segments such as the video segment of the HBO TV programs. Accordingly, the shutter glasses 105 in this embodiment can be applied to viewing or watching the dual two-dimensional images when the shutter glasses 105 operate under the dual two-dimensional image viewing mode. In addition, the shutter glasses 105 can be further utilized for dynamically adjusting the lengths of the shutter-open periods of the shutter lenses in accordance with different environments or different types/categories of images, so as to adjust the ambient brightness received via the shutter lenses. This can make the user perceive dual two-dimensional vision when the user watches dual two-dimensional images.

For viewing either a video stream displayed during the image output periods T1, T3 or another video stream displayed during the image output period T2, the adjusting circuit 115 can extend or prolong the lengths of the shutter-open periods of the shutter lenses to respectively further include a portion of the next image output period without affecting the display of the image during such the next image output period. Under a condition that the shutter-open periods of the shutter lenses during the current image output period do not overlap with the shutter-open periods of another pair of shutter lenses during the next image output period, the adjusting circuit 115 can properly adjust the lengths of the shutter-open periods of the shutter lenses mentioned above, so as to make the lengths be longer than the activation time length of the backlight and further include a portion t' of the second image output period T2 that is adjacent to the first image output period T1, for achieving the objective of adjusting the ambient brightness received via the shutter glasses 105. Therefore, the operation of utilizing the adjusting circuit 115 to extend or prolong the lengths of the shutter-open periods of the shutter lenses to further include a portion of the previous image output period or a portion of the next image output period so as to dynamically adjust the ambient brightness received via the shutter glasses 105 falls within the scope of the present invention. It should also be noted that the first and second videos included within the dual two-dimension image stream mentioned above are not limited to videos of a TV channel programs. The sources of the first and second videos can originate from Blue-ray discs or other multimedia sources. All image sources fall within the scope of the present invention.

Please refer to FIG. 4A, which is a diagram illustrating the operation of the shutter glasses 105 as shown in FIG. 1A and FIG. 1B under the two-dimensional image viewing mode for receiving a three-dimensional image stream according to an embodiment of the present invention. For displaying the images of the three-dimensional image stream, the display device 110 is arranged to alternately output left-eye pictures such as the first image pictures (L1 and L2) and right-eye pictures such as the second image pictures (R1 and R2). The image output periods for outputting the left-eye pictures and the right-eye pictures are interlaced. For example, T1 is the image output period for outputting a left-eye picture when the display device 110 is arranged to display three-dimensional images, and T2 is the image output period for outputting a right-eye picture when the three-dimensional images are displayed. If the left eye and right eye of the user respectively perceive the left-eye picture and right-eye picture, then the human eyes would perceive a three-dimensional image effect. In this embodiment, the shutter glasses 105 operate under the two-dimensional image viewing mode, and both the left-eye and right-eye shutter lenses 1051 and 1052 are configured to stay in the open state or closed state at the same time so that via the shutter glasses 105 the human eyes can simultaneously perceive one left-eye picture and one right-eye picture, and the left eye and right eye of the user will not respectively perceive the left-eye picture and right-eye picture. Consequently, when the display device 110 is arranged to display a three-dimensional image stream, the user can view two-dimensional images by using the shutter glasses 105.

In FIG. 4A, the backlight of the display device 110 is turned on or activated during the hold time t2 of each image output period, as indicated by the curve BL4. The activation time of the backlight includes a first portion of the current image output period. The adjusting circuit 115 is arranged to adjust the length of the shutter-open period of the left-eye shutter lens 1051 of the shutter glasses 105 by referring to the ambient brightness control signal S_C so that the length of the shutter-open period is longer than the first portion t2 mentioned above and further includes a second portion of the current image output period, e.g. a portion t" of the paint time t1 of the image output period T1. The adjusting circuit 115 can adjust the ambient brightness received via the left-eye shutter lens 1051 of the shutter glasses 105. In addition, the adjusting circuit 115 is arranged to adjust the length of the shutter-open period of the right-eye shutter lens 1052 by referring to the ambient brightness control signal S_C so that the length of the shutter-open period can be longer than the first portion t2 mentioned above and further include the third portion of the current image output period such as a portion t" of the paint time t1 of the image output period T1. The adjusting circuit 115 can adjust the ambient brightness received via the right-eye shutter lens 1052 of the shutter glasses 105. As indicated by the curves S5 and S6 shown in FIG. 4A, the shutter-open period and corresponding time length of the left-eye shutter lens 1051 are identical to those of the right-eye shutter lens 1052. In other words, the second portion and the third portion of the current image output period are the same as the time portion t". In addition, each of the shutter-open periods of the left-eye and right-eye shutter lenses 1051 and 1052 further include a portion t''' of the next image output period T2. The adjusting circuit 115 can adjust the lengths of the shutter-open periods of the left-eye and right-eye shutter lenses 1051 and 1052 so that the length of each shutter-open period can be longer than the first portion t2 and further include another portion of the next image output period such as a portion t''' of the paint time t1 of the image output period T2. In this way, the adjusting circuit 115 can adjust the ambient brightness respectively received via the left-eye and right-eye shutter lenses 1051 and 1052.

Figure 1C:
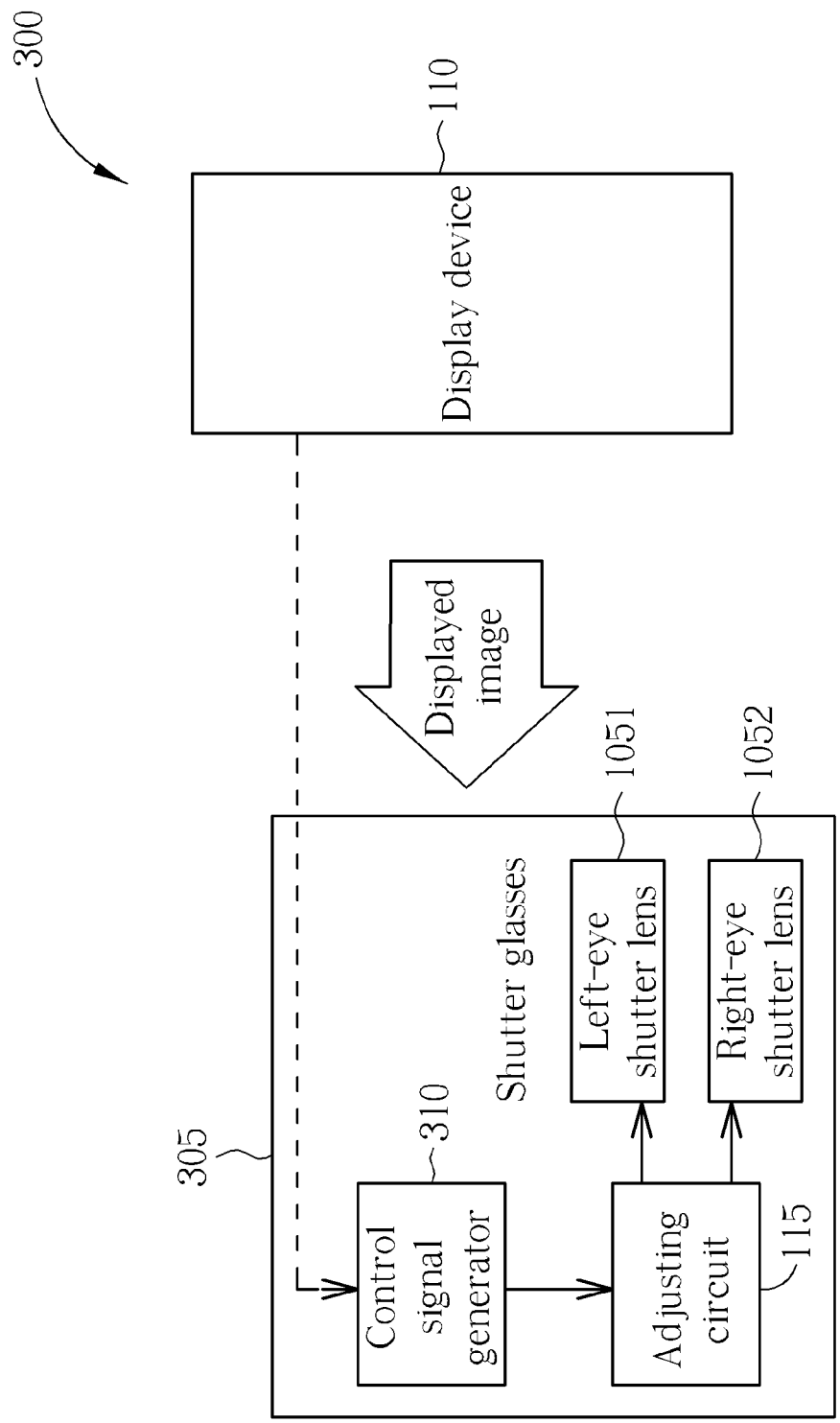
FIG. 1C is a diagram illustrating an image display system according to a third embodiment of the present invention.

When the length of the shutter-open period of the left-eye shutter lens 1051 is substantially equal to that of the shutter-open period of the right-eye shutter lens 1052, the shutter-open periods of the shutter lenses can be modified for different implementations. Please refer to FIG. 4B-FIG. 4C. As shown in FIG. 4B-FIG. 4C, a portion of the shutter-open period of the left-eye shutter lens 1051 can overlap with a portion of the shutter-open period of the right-eye shutter lens 1052. For example, as shown in FIG. 4B, the curve S7 indicates that the shutter-open period of the left-eye shutter lens 1051 includes a portion t" and the hold time t2 of the current image output period T1. The curve S8 indicates that the shutter-open period of the right-eye shutter lens 1052 includes the hold time t2 of the current image output period and a portion t''' of the next image output period T2. The left-eye and right-eye shutter lenses 1051 and 1052 are not configured to enter/exit the open state at the same time. This can also achieve the effect of adjusting the ambient brightness received via the shutter glasses 105. The operation of the embodiment as shown in FIG. 4C is similar to that of the embodiment as shown in FIG. 4B. A difference between the operations is that the curve S9 is indicative of the left-eye shutter lens' shutter-open period including the hold time t2 of the current image output period T1 and the portion t''' of the next image output period T2, and the curve S10 is indicative of the right-shutter lens' shutter-open period including the portion t" and hold time t2 of the current image output period T1; further description is not detailed here for brevity. It should be noted that the above-described operations for adjusting the activation times of the backlight and shutter lenses as shown in FIG. 2A, FIG. 2B, FIG. 3, and FIG. 4A-FIG. 4C can also be applied to the display device 110 and shutter glasses 305 as shown in FIG. 1C.

For ease of comprehension of the operations of the embodiments mentioned above, FIG. 5A and FIG. 5B respectively illustrate flowcharts of the method for controlling the ambient brightness received via the shutter glasses according to the embodiments of the present invention. Provided that substantially the same result is achieved, the steps of the flowcharts shown in FIG. 5A and FIG. 5B need not be in the exact order shown and need not be contiguous; that is, other steps can be intermediate. The description of the steps is detailed in the following:

Step 502: Start;

Step 504: The shutter glasses operate under the two-dimensional image viewing mode, and the control signal generator generates the ambient brightness control signal S_C;

Step 506: The adjusting circuit determines whether an input image stream is a single two-dimensional image stream. If yes, the flow proceeds to Step 508; otherwise, the flow proceeds to Step 510;

Step 508: The adjusting circuit adjusts the shutter-open periods of the shutter lenses by referring to the ambient brightness control signal S_C so as to make the lengths of the shutter-open periods of the shutter lenses be longer than the activation time length of the backlight and be shorter than the whole length of an image output period, or alternatively make the lengths of the shutter-open periods of the shutter lenses be longer than the whole length of the first image output period and be shorter than a total length of the first and second image output periods;

Step 510: The adjusting circuit determines whether the input image stream is a dual two-dimensional image stream. If yes, the flow proceeds to Step 512; otherwise, the flow proceeds to Step 514;

Step 512: The adjusting circuit adjusts the shutter-open periods of the shutter lenses by referring to the ambient brightness control signal S_C, so as to make the lengths of the shutter-open periods of the shutter lenses be longer than the activation time length of the backlight and respectively further include another portion of the image output period, or alternatively make the lengths of the shutter-open periods of the shutter lenses be longer than the activation time length of the backlight and respectively further include a potion of the second image output period that is adjacent to the first image output period;

Step 514: The adjusting circuit determines whether the input image stream is a three-dimensional image stream. If so, the flow proceeds to Step 516; otherwise, the flow proceeds to Step 518;

Step 516: The adjusting circuit adjusts the shutter-open periods of the shutter lenses by referring to the ambient brightness control signal S_C, so as to make the lengths of the shutter-open periods of the left-eye and right-eye shutter lenses be longer than the activation time length of the backlight and respectively further include a portion of an image output period, or alternatively make the lengths of the shutter-open periods of the left-eye and right-eye shutter lenses be longer than the activation time length of the backlight and respectively further include a portion of another image output period that is adjacent to the image output periods;

Step 518: End.

The ambient brightness control signal S_C for adjusting the lengths of the shutter-open periods can be generated automatically or manually by users, in addition to referring to changes in images displayed on the display panel of the display device (e.g. changes in brightness, colors, and gray levels), changes of the ambient brightness, and instruction signals for controlling the shutter glasses. Additionally, the ambient brightness control signal S_C can also be generated by referring to the operating state of the shutter glasses, the operating state of the display device, the types/categories of video content, types of video files, programs for displaying video files, file amounts or display time periods of video files, data transmitting interfaces externally coupled to the video signal source, types/categories of a device providing the external video signal source, or information of the power supply of the shutter glasses etc. Please note that, in the following description, the operations of generating the ambient brightness control signal S_C according to different information are detailed and these operations can also be suitable for and applied to the control signal generators 125 and 310 mentioned above.

For manual adjustment, the control signal generators 125 and 310 can respectively receive user settings and generate the ambient brightness control signal S_C according to the received user settings. The adjusting circuit 115 is arranged to adjust the lengths of the shutter-open periods of the shutter lenses of the shutter glasses 105 and 305 in accordance with the received ambient brightness control signal S_C. The user can manually adjust the ambient brightness by using the control signal generators 125 and 310 according to desired ambient brightness when the user wears the shutter glasses 105 or 305. For example, the user can adjust the ambient brightness via an on-screen display (OSC) according to requirements. As the operations and functions of the control signal generators 125 and 310 have been described above, further description is not detailed here for brevity. In the above embodiments, a manual adjusting mechanism is provided for the user to adjust the ambient brightness perceived via the shutter glasses. In addition to the manual adjusting mechanism, in other embodiments, an automatic adjusting mechanism can also be provided to effectively adjust the ambient brightness. By adopting the automatic adjusting mechanism, the ambient brightness received via the shutter glasses can be automatically adjusted or calibrated, without any user's settings or inputs.

In another embodiment, the control signal generators 125 and 310 are arranged to detect the operating states of the display device 110 or the shutter glasses 105 and 305 for generating the ambient brightness control signal S_C, and then adjust the ambient brightness received via the shutter glasses 105 and 305 according to the ambient brightness control signal S_C. When the control signal generators 125 and 310 perform detection of the operating state for the display device 110 to generate the ambient brightness control signal S_C, in an implementation of the first example, the control signal generators 125 and 310 are able to generate the ambient brightness control signal S_C according to video contents to be displayed by the display device 110. With respect to different types/categories of video contents displayed by the display device 110, the control signal generators 125 and 310 can decide different ambient brightness setting values. Since the different types/categories of video contents respectively indicate different usages of the image display system, the control signal generators 125 and 310 can automatically adjust the ambient brightness so that the user perceives the appropriate ambient brightness when wearing the shutter glasses 105 or 305. For example, when the user utilizes the image display system to view a three-dimensional film, and the user would only like to view the contents displayed on the screen without viewing ambient images outside of the screen, the control signal generators 125 and 310 can decide a first ambient brightness value so as to make the shutter glasses 105 and 305 operate under a first mode. When utilizing the image display system to view the three-dimensional TV programs, the user may like to view ambient images outside of the screen in addition to the contents displayed on the screen. Accordingly, the control signal generators 125 and 310 can decide a second ambient brightness value so as to make the shutter glasses 105 or 305 operate under a second mode. When utilizing the image display system to play a three-dimensional game, the user may need to use the shutter glasses 105 and 305 for a prolonged time period and may need to perceive ambient images outside of the screen. In this situation, the power of the shutter glasses 105 and 305 is provided by a battery, and the ambient images outside of the screen are images of a joystick and a keyboard. Accordingly, the control signal generators 125 and 310 can decide a third ambient brightness value so as to make the shutter glasses 105 or 305 operate under a third mode. In addition, when utilizing the image display system to view or draw/edit a three-dimensional image picture, the user may need to perceive ambient images output from the screen (e.g. documents or files) in addition to the three-dimensional image picture displayed on the screen. Accordingly, the control signal generators 125 and 310 can decide a fourth ambient brightness value so as to make the shutter glasses 105 or 305 operate under a fourth mode.

As mentioned above, the different types/categories of the video contents respectively indicate different usages of the image display systems 100, 200, and 300. Consequently, it is necessary to generate different ambient brightness control signals S_C to generate different ambient brightness values. The usages of the image display systems 100, 200, and 300 can be estimated according to the video content to be displayed. For example, the display device 110 is arranged to generate the ambient brightness control signal S_C according to the format of the video file displayed thereon (for example, when the file extension is avi, it means that the user is viewing a three-dimensional stereoscopic film by means of the image display systems 100, 200, and 300, and when the file extension is jpg, it means that the user is viewing or drawing a three-dimensional image picture by means of the image display systems 100, 200, and 300), or the playback program of the video file (for example, when the application program interface of DirectX is run, it means that the user is playing a stereoscopic game by means of the image display systems 100, 200, and 300, and when the multimedia player is run, it means that the user is viewing a stereoscopic film by means of the image display systems 100, 200, and 300), or the file size/playback time of the video file (for example, if the file size of the video file is larger than 2 GB, it means that the user is viewing a three-dimensional stereoscopic film by means of the image display systems 100, 200, and 300, and if the file size of the video file is smaller than 1 MB, it means that the user is viewing or drawing a three-dimensional image picture by means of the image display systems 100, 200, and 300). These examples are for illustrative purposes only, and are not meant to be limitations to the present invention.

Suppose that the control signal generators 125 and 310 are arranged to generate the ambient brightness control signals S_C by estimating the operating state of the display device 110. In the second exemplary implementation, the control signal generators 125 and 310 can generate the ambient brightness control signals S_C according to a data transmitting interface that provides the video content to be displayed on the video device 110. For example, the display device 110 has a plurality of data transmitting interfaces (e.g. data transmitting interfaces P1-P4 not shown in Figures), wherein a signal source is connected to the data transmitting interface P1 in order to provide the video content to be displayed on the display device 110. By way of example, data transmitting interfaces P1-P4 include data transmitting interfaces of different interface standards, such as a universal serial bus (USB) interface, a high-definition multimedia interface (HDMI), a network interface and a TV signal input interface.

If the data transmitting interface P1 is a USB interface, it means that the user probably views or draws a three-dimensional image picture by means of the image display systems 100 and 300. The control signal generators 125 and 310 then generate the ambient brightness control signals S_C according to the different data transmitting interfaces in order to make the shutter glasses 105 or 305 operate under different modes. If the data transmitting interface P1 is an HDMI interface, it means that the user probably views a three-dimensional stereoscopic film by means of the image display systems 100 and 300. Thus, the control signal generators 125 and 310 are arranged to generate the ambient brightness control signals S_C according to the HDMI interface. If the data transmitting interface P1 is a network interface or a TV signal input interface, it means that the user probably views a three-dimensional stereoscopic TV program by means of the image display systems 100, 200, and 300. Thus, the control signal generators 125 and 310 are arranged to generate the ambient brightness control signals S_C according to the network interface or TV signal input interface. Please note that the description mentioned above is only for illustrative purposes, and is not meant to be a limitation to the present invention.

In another exemplary embodiment, data transmitting interfaces P1-P4 may include a plurality of data transmitting interfaces of the same interface standard. For example, data transmitting interfaces P1-P4 are HDMI interfaces and utilized for connecting different signal sources. If the data transmitting interface P1 connected to the signal source is the first HDMI interface, it means that the user is playing a three-dimensional stereoscopic game by means of the image display systems 100, 200, and 300. The control signal generators 125 and 310 are therefore arranged to generate the ambient brightness control signals S_C according to the first HDMI interface in order to make the shutter glasses 105 or 305 operate under an appropriate operating mode. If the data transmitting interface P1 is the second HDMI interface, it means that the user probably views a three-dimensional stereoscopic film by means of the image display systems 100, 200, and 300. Thus, the control signal generators 125 and 310 are arranged to generate the ambient brightness control signals S_C according to the second HDMI interface in order to make the shutter glasses 105 or 305 operate under an appropriate operating mode. If the data transmitting interface P1 is the third or the fourth HDMI interface, it means that the user is probably viewing a three-dimensional stereoscopic TV program by means of the image display systems 100, 300, and 300. Thus, the control signal generators 125 and 310 are arranged to generate the ambient brightness control signals S_C in order to make the shutter glasses 105 or 305 operate under an appropriate operating mode. Please note that the description mentioned above is only for illustrative purposes, and is not meant to be a limitation to the present invention.

Suppose that the control signal generators 125 and 310 are arranged to generate the ambient brightness control signals S_C by estimating the operating state of the display device 110. In the third exemplary implementation, the control signal generators 125 and 310 can generate the ambient brightness control signals S_C according to the signal source that provides the video content to be displayed on the display device 110. For example, if the signal source is an optical disc player (e.g. a Blue-ray disc player), it means that the user probably views a dimensional stereoscopic films by means of the image display systems 100, 200, and 300. The control signal generators 125 and 310 are then arranged to generate the ambient brightness control signals S_C according to the optical disc player in order to make the shutter glasses 105 or 305 operate under an appropriate operating mode. If the signal source is a video game console, it means that the user probably plays a three-dimensional stereoscopic game by means of the image display systems 100, 200, and 300. Thus, the control signal generators 125 and 310 are arranged to generate the ambient brightness control signals S_C according to the video game console in order to make the shutter glasses 105 or 305 operate under an appropriate operating mode. If the signal source is a computer host, it means that the user probably views or draws a three-dimensional image picture by means of the image display systems 100, 200, and 300. Thus, the control signal generators are arranged to generate the ambient brightness control signals S_C according to the computer host in order to make the shutter glasses 105 or 305 operate under an appropriate operating mode. Please note that the description mentioned above is only for illustrative purposes, and is not meant to be a limitation to the present invention.

The video content to be displayed on the display device 110 is offered by an external signal source; however, the video content to be displayed on the display device 110 can also be offered by an internal signal source (e.g. a built-in storage or optical disc drive) of the display device 110. The first exemplary implementation described above (i.e. the implementation in which the display device 110 is arranged to generate the ambient brightness control signal S_C according to the video content to be displayed) can be utilized for adjusting the ambient brightness setting value automatically.

Suppose that the control signal generators 125 and 310 are arranged to generate the ambient brightness control signals S_C by estimating the operating states of the shutter glasses 105 and 305. In the first exemplary implementation, the control signal generators 125 and 310 can generate the ambient brightness control signals S_C according to power supply information of the shutter glasses 105 and 305, respectively. For example, the control signal generators 125 and 310 each have an internal timer in order to count the using time of each shutter glasses 105 and 310, wherein the control signal generators decide how to adjust the ambient brightness according to the using time. A fully charged battery can only maintain 40-hour regular operation of each pair of shutter glasses 105 and 305. When the shutter glasses 105 and 305 have been used for 38 hours, the timer functions of the control signal generators 125 and 310 know that the electric power left in the battery can only allow the shutter glasses 105 and 305 to work normally for another 2 hours. If there is no voltage imposed on the liquid crystal layer, the shutter lens will stay in the open state, allowing light beams to penetrate. The control signal generators 125 and 310 can adjust the ambient brightness in order to prolong the lengths of the shutter-open periods of the shutter glasses (i.e. increase the ambient brightness perceived by the user via the shutter glasses), thereby decreasing the power consumption of the shutter glasses 105 and 305 and prolonging the using time of the shutter glasses 105 and 305.

When generating the ambient brightness control signals S_C, the control signal generators 125 and 310 can refer to the estimating result of the power supply information of the shutter glasses 105 and 305 as well as the estimating result of the video content to be displayed on the display device 110. For example, before the display device 110 starts playing the video content (e.g. a film), the timer functions of the control signal generators 125 and 310 know that the electric power left in the batteries can only allow the shutter glasses 105 and 305 to work normally for 2 hours, respectively, and the length of the video content to be displayed is 3 hours. In this case, the control signal generators 125 and 310 can generate different ambient brightness control signals S_C to respectively adjust the ambient brightness in order to prolong the shutter-open time period of the shutter glasses 105 and 305 (i.e. increase the ambient brightness perceived by the user via the shutter glasses 105 and 305), thereby decreasing the power consumption of the shutter glasses 105 and 305 to allow the user to successfully finish viewing the video content displayed on the display device 110.

Please note that, in the exemplary embodiments, each pair of shutter glasses 105 and 305 is powered by the battery; however, this is not meant to be a limitation to the present invention. The shutter glasses collaborating with the display device 110 can also be powered by an external power supply (e.g. a wall outlet) which delivers electric power via a wired means. Similarly, the aforementioned manual adjusting mechanism can be employed to allow the user to adjust the ambient brightness perceived via the shutter glasses according to requirements. User setting can be directly received and used for adjusting/updating the current ambient brightness. Alternatively, the aforementioned automatic adjusting mechanism can be employed to automatically apply a proper adjustment to the ambient brightness perceived via the shutter glasses. For example, the operating state of the display device 110 is estimated for determining how to adjust/update the current ambient brightness. Under certain ambient brightness settings, this has the advantage of reducing the power consumption of the shutter glasses 105 and 305. These alternative designs all obey the spirit of the present invention.

In summary, the user can perceive different ambient brightness via the shutter glasses under different operating modes through manually or automatically adjusting the ambient brightness setting of the shutter glasses. In this way, the overall image viewing quality is greatly improved when the user wears the shutter glasses. For example, when the display device 110 is operating under the refresh rate of 120 Hz, the percentage of a stabilization time (e.g. a vertical blanking interval (VBI)) within the whole glasses period is 16%, and the light transmission rate of the ambient light is 36% for the shutter lens staying in the open state, the brightness finally perceived by the user (i.e. the light transmission rate of the shutter lens) is in the range from 2.88% to 33.1% by properly controlling the left-eye shutter lens and the right-eye shutter lens to switch between the open state and the closed state. Compared to the ambient brightness perceived under the lowest light transmission rate of 2.88%, the ambient brightness can be improved to be at most 16 times as great as the original ambient brightness via a proper control of the shutter glasses. When the display device 110 is operating under the refresh rate of 120 Hz, the percentage of the stabilization time (e.g. the vertical blanking interval) within the whole glasses period is 32%, and the light transmission rate of the ambient light is 36% for the shutter lens staying in the open state, the brightness finally perceived by the user (i.e. the light transmission rate of the shutter lens) is in the range from 5.76% to 30.2% through properly controlling the left-eye shutter lens and the right-eye shutter lens to switch between the open state and the closed state. Compared to the ambient brightness perceived under the lowest light transmission rate of 5.76%, the ambient brightness can be improved to be almost 6 times as great as the original ambient brightness via a proper control of the shutter glasses. Moreover, when the display device 110 is operating under the refresh rate of 240 Hz, the percentage of an image output period of a secondary image within the whole glasses period is 50%, and the light transmission rate of the ambient light is 36% for the shutter lens staying in the open state, the brightness finally perceived by the user (i.e. the light transmission rate of the shutter lens) is in the range from 9% to 27% through properly controlling the left-eye shutter lens and the right-eye shutter lens to switch between the open state and the closed state. Compared to the ambient brightness perceived under the lowest light transmission rate of 9%, the ambient brightness can be improved to be at most 3 times as great as the original ambient brightness via a proper control of the shutter glasses. It should be noted that the values mentioned above are for illustrative purposes only, and are not meant to be limitations to the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling an ambient brightness received by a pair of shutter glasses, the shutter glasses being operated under a two-dimensional image viewing mode, the method comprising:
   generating an ambient brightness control signal; and
   adjusting a shutter-open period of a shutter lens of the shutter glasses in accordance with the ambient brightness control signal so as to make a length of the shutter-open period of the shutter glasses be longer than an activation time length of a backlight of a display device, for adjusting the ambient brightness received by the shutter glasses.

2. The method of claim 1, wherein the display device alternately outputs a first image picture and a second image picture during a plurality of respective image output periods; the first and second image pictures respectively correspond to a first video and a second video; an image of the first image picture is equal to an image of the second image picture; the activation time of the backlight comprises a portion of an image output period, and the step of adjusting the shutter-open period of the shutter glasses in accordance with the ambient brightness control signal comprises:
   adjusting the shutter-open period of the shutter glasses by referring to the ambient brightness control signal, so as to make the length of the shutter-open period of the shutter glasses be longer than a length of the portion of the image output period and shorter than a length of the image output period, for adjusting the ambient brightness received by the shutter glasses.

3. The method of claim 1, wherein the display device alternately outputs a first image picture and a second image picture during a plurality of respective image output periods; the first and second image pictures respectively correspond to a first video and a second video; an image of the first image picture is equal to an image of the second image picture; the activation time of the backlight comprises a portion of a first image output period, and the step of adjusting the shutter-open period of the shutter glasses in accordance with the ambient brightness control signal comprises:
   adjusting the shutter-open period of the shutter glasses by referring to the ambient brightness control signal, so as to make a length of the shutter-open period of the shutter glasses be longer than a length of the first image output period and shorter than a total length of the first image output period and a second image output period that is adjacent to the first image output period, for adjusting the ambient brightness received by the shutter glasses.

4. The method of claim 1, wherein the display device alternately outputs a first image picture and a second image picture during a plurality of respective image output periods; the first and second image pictures respectively correspond to a first video and a second video; an image of the first image picture is different from an image of the second image picture, and the first and second videos are different two-dimensional videos respectively; the activation time of the backlight comprises a portion of an image output period, and the step of adjusting the shutter-open period of the shutter glasses in accordance with the ambient brightness control signal comprises:
   adjusting the shutter-open period of the shutter glasses by referring to the ambient brightness control signal, so as to make a length of the shutter-open period of the shutter glasses be longer than a length of the portion of the image output period and further include a length of another portion of the image output period, for adjusting the ambient brightness received by the shutter glasses.

5. The method of claim 1, wherein the display device alternately outputs a first image picture and a second image picture during a plurality of respective image output periods; the first and second image pictures respectively correspond to a first video and a second video; an image of the first image picture is different from an image of the second image picture, and the first and second videos are different two-dimensional videos respectively; the activation time of the backlight comprises a portion of a first image output period, and the step of adjusting the shutter-open period of the shutter glasses in accordance with the ambient brightness control signal comprises:
   adjusting the shutter-open period of the shutter glasses by referring to the ambient brightness control signal, so as to make a length of the shutter-open period of the shutter glasses be longer than a length of the portion of the first image output period and further include a length of a portion of a second image output period that is adjacent to the first image output period, for adjusting the ambient brightness received by the shutter glasses.

6. The method of claim 1, wherein the display device alternately outputs a first image picture and a second image picture during a plurality of respective image output periods; one of the first and second image pictures is a left-eye image, and the other is a right-eye image; the activation time of the backlight comprises a first portion of an image output period, and the step of adjusting the shutter-open period of the shutter glasses in accordance with the ambient brightness control signal comprises:
   adjusting a shutter-open period of a left-eye shutter lens of the shutter glasses by referring to the ambient brightness control signal, so as to make a length of the shutter-open period of the left-eye shutter lens be longer than a length of the first portion of the image output period and further include a length of a second portion of the image output period, for adjusting an ambient brightness received by the left-eye shutter lens of the shutter glasses; and
   adjusting a shutter-open period of a right-eye shutter lens of the shutter glasses by referring to the ambient brightness control signal, so as to make a length of the shutter-open period of the right-eye shutter lens be longer than a length of the first portion of the image output period and further include a length of a third portion of the image output period, for adjusting an ambient brightness received by the right-eye shutter lens of the shutter glasses;
   wherein the shutter-open period of the left-eye shutter lens overlaps with the shutter-open period of the right-eye shutter lens.

7. The method of claim 1, wherein the display device alternately outputs a first image picture and a second image picture during a plurality of respective image output periods; one of the first and second image pictures is a left-eye image, and the other is a right-eye image; the activation time of the backlight comprises a first portion of a first image output period, and the step of adjusting the shutter-open period of the shutter glasses in accordance with the ambient brightness control signal comprises:
   adjusting a shutter-open period of a left-eye shutter lens of the shutter glasses by referring to the ambient brightness control signal, so as to make a length of the shutter-open period of the left-eye shutter lens be longer than a length of the first portion of the image output period and further include a length of a second portion of a second image output period that is adjacent to the first image output period, for adjusting an ambient brightness received by the left-eye shutter lens of the shutter glasses; and adjusting a shutter-open period of a right-eye shutter lens of the shutter glasses by referring to the ambient brightness control signal, so as to make a length of the shutter-open period of the right-eye shutter lens be longer than a length of the first portion of the first image output period and further include a length of a third portion of the second image output period that is adjacent to the first image output period, for adjusting an ambient brightness received by the right-eye shutter lens of the shutter glasses;

wherein the shutter-open period of the left-eye shutter lens overlaps with the shutter-open period of the right-eye shutter lens.

8. A pair of shutter glasses for controlling an ambient brightness received by shutter lenses of the shutter glasses that are operated under a two-dimensional image viewing mode, the shutter glasses comprising:

a left-eye shutter lens;

a right-eye shutter lens; and an adjusting circuit, coupled to the left-eye and right-eye shutter lenses, for adjusting a shutter-open period of the shutter glasses in accordance with an ambient brightness control signal, so as to make a length of the shutter-open period of the shutter glasses be longer than an activation time length of a backlight of a display device, for adjusting the ambient brightness received by the shutter glasses.

9. The shutter glasses of claim 8, wherein the display device alternately outputs a first image picture and a second image picture during a plurality of respective image output periods; the first and second image pictures respectively correspond to a first video and a second video; an image of the first image picture is equal to an image of the second image picture; the activation time of the backlight comprises a portion of an image output period; and, the adjusting circuit adjusts the shutter-open period of the shutter glasses by referring to the ambient brightness control signal, so as to make a length of the shutter-open period of the shutter glasses be longer than a length of the portion of the image output period and shorter than a length of the image output period, for adjusting the ambient brightness received by the shutter glasses.

10. The shutter glasses of claim 8, wherein the display device alternately outputs a first image picture and a second image picture during a plurality of respective image output periods; the first and second image pictures respectively correspond to a first video and a second video; an image of the first image picture is equal to an image of the second image picture; the activation time of the backlight comprises a portion of a first image output period; and the adjusting circuit adjusts the shutter-open period of the shutter glasses by referring to the ambient brightness control signal, so as to make a length of the shutter-open period of the shutter glasses be longer than a length of the first image output period and shorter than a total length of the first image output period and a second image output period that is adjacent to the first image output period, for adjusting the ambient brightness received by the shutter glasses.

11. The shutter glasses of claim 8, wherein the display device alternately outputs a first image picture and a second image picture during a plurality of respective image output periods; the first and second image pictures respectively correspond to a first video and a second video; an image of the first image picture is different from an image of the second image picture, and the first and second videos are different two-dimensional videos respectively; the activation time of the backlight comprises a portion of an image output period; and the adjusting circuit adjusts the shutter-open period of the shutter glasses by referring to the ambient brightness control signal, so as to make a length of the shutter-open period of the shutter glasses be longer than a length of the portion of the image output period and further include a length of another portion of the image output period, for adjusting the ambient brightness received by the shutter glasses.

12. The shutter glasses of claim 8, wherein the display device alternately outputs a first image picture and a second image picture during a plurality of respective image output periods; the first and second image pictures respectively correspond to a first video and a second video; an image of the first image picture is different from an image of the second image picture, and the first and second videos are different two-dimensional videos respectively; the activation time of the backlight comprises a portion of a first image output period; and the adjusting circuit adjusts the shutter-open period of the shutter glasses by referring to the ambient brightness control signal, so as to make a length of the shutter-open period of the shutter glasses be longer than a length of the portion of the first image output period and further include a length of a portion of a second image output period that is adjacent to the first image output period, for adjusting the ambient brightness received by the shutter glasses.

13. The shutter glasses of claim 8, wherein the display device alternately outputs a first image picture and a second image picture during a plurality of respective image output periods; one of the first and second image pictures is a left-eye image, and the other is a right-eye image; the activation time of the backlight comprises a first portion of an image output period; the adjusting circuit adjusts a shutter-open period of a left-eye shutter lens of the shutter glasses by referring to the ambient brightness control signal, so as to make a length of the shutter-open period of the left-eye shutter lens be longer than a length of the first portion of the image output period and further include a length of a second portion of the image output period, for adjusting an ambient brightness received by the left-eye shutter lens of the shutter glasses; and the adjusting circuit further adjusts a shutter-open period of a right-eye shutter lens of the shutter glasses by referring to the ambient brightness control signal, so as to make a length of the shutter-open period of the right-eye shutter lens be longer than a length of the first portion of the image output period and further include a length of a third portion of the image output period, for adjusting an ambient brightness received by right-eye shutter lens of the shutter glasses, wherein the shutter-open period of the left-eye shutter lens overlaps with the shutter-open period of the right-eye shutter lens.

14. The shutter glasses of claim 8, wherein the display device alternately outputs a first image picture and a second image picture during a plurality of respective image output periods; one of the first and second image pictures is a left-eye image, and the other is a right-eye image; the activation time of the backlight comprises a first portion of a first image output period; the adjusting circuit adjusts a shutter-open period of a left-eye shutter lens of the shutter glasses by referring to the ambient brightness control signal, so as to make a length of the shutter-open period of the left-eye shutter lens be longer than a length of the first portion of the first image output period and further include a length of a second portion of a second image output period that is adjacent to the first image output period, for adjusting an ambient brightness received by left-eye shutter lens of the shutter glasses; and the adjusting circuit further adjusts a shutter-open period of a right-eye shutter lens of the shutter glasses by referring to the ambient brightness control signal, so as to make a length of the shutter-open period of the right-eye shutter lens be longer than a length of the first portion of the first image output period and further include a length of a third portion of the second image output period that is adjacent to the first image output period, for adjusting an ambient brightness received by the right-eye shutter lens of the shutter glasses, wherein the shutter-open period of the left-eye shutter lens overlaps with the shutter-open period of the right-eye shutter lens.

15. The shutter glasses of claim 8, further comprising:
a control signal generator, coupled to the adjusting circuit, for generating the ambient brightness control signal.

16. A control signal generator for adjusting an ambient brightness received by a pair of shutter glasses, the shutter glasses being operated under a two-dimensional image viewing mode, and the control signal generator is utilized for generating an ambient brightness control signal and outputting the ambient brightness control signal to the shutter glasses for adjusting a shutter-open period of the shutter glasses, so as to make a length of the shutter-open period of the shutter glasses be longer than an activation time length of a backlight of a display device, for adjusting the ambient brightness received by the shutter glasses.

17. The control signal generator of claim 16 being configured within the display device.

18. The control signal generator of claim 16 being externally coupled to the display device.

* * * * *